United States Patent
Takemoto

(10) Patent No.: US 8,237,965 B2
(45) Date of Patent: Aug. 7, 2012

(54) APPARATUS, SYSTEM, AND METHOD OF COMMUNICATION

(75) Inventor: Yuji Takemoto, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 760 days.

(21) Appl. No.: 12/382,175

(22) Filed: Mar. 10, 2009

(65) Prior Publication Data

US 2009/0231603 A1    Sep. 17, 2009

(30) Foreign Application Priority Data

Mar. 11, 2008  (JP) .................... 2008-060460

(51) Int. Cl.
  *G06F 3/12* (2006.01)
  *H04N 1/32* (2006.01)
(52) U.S. Cl. ........... 358/1.15; 358/468
(58) Field of Classification Search ........... 358/1.9, 358/1.15, 1.13, 2.1, 500, 448, 434, 518
See application file for complete search history.

(56) References Cited

U.S. PATENT DOCUMENTS

| | | | |
|---|---|---|---|
| 7,542,181 B2 * | 6/2009 | Kato | 358/474 |
| 7,764,392 B2 * | 7/2010 | Kumakura | 358/1.15 |
| 2001/0038469 A1 * | 11/2001 | Saito | 358/518 |
| 2003/0067626 A1 * | 4/2003 | Ohmori et al. | 358/1.15 |
| 2006/0238781 A1 * | 10/2006 | Fukao | 358/1.9 |
| 2007/0177193 A1 * | 8/2007 | Kumakura | 358/1.15 |
| 2009/0213396 A1 * | 8/2009 | Togami | 358/1.9 |
| 2009/0225378 A1 * | 9/2009 | Minamino | 358/513 |

FOREIGN PATENT DOCUMENTS

| | | |
|---|---|---|
| JP | 11-103396 | 4/1999 |
| JP | 2002-057906 | 2/2002 |
| JP | 2002-342054 | 11/2002 |
| JP | 2004-186928 | 7/2004 |
| JP | 2005-210531 | 8/2005 |
| JP | 2006-345457 | 12/2006 |
| JP | 2007-158798 | * 6/2007 |
| JP | 2007-316854 | 12/2007 |

* cited by examiner

*Primary Examiner* — Jerome Grant, II
(74) *Attorney, Agent, or Firm* — Harness, Dickey & Pierce P.L.C.

(57) ABSTRACT

An apparatus, method, and system of determining which one of monochrome image data and color image data is desired according to a user instruction, and sending the image data in the desired format.

6 Claims, 23 Drawing Sheets

FIG. 4

TRANSMISSION TYPE — DL

B/W FAX ▼

BXa — ☐ CALL REGISTERED ADDRESS

FAX NO.

01234567890 — BXb

COMMUNICATION LINE

G3 ▼

SEND — BBa

ADD TO FAX JOB LIST — BBb

DPa

FAX JOB LIST: 0

| TO: | FAX NO. /ADDRESS |
|---|---|
|  |  |

DPb

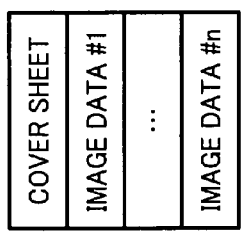
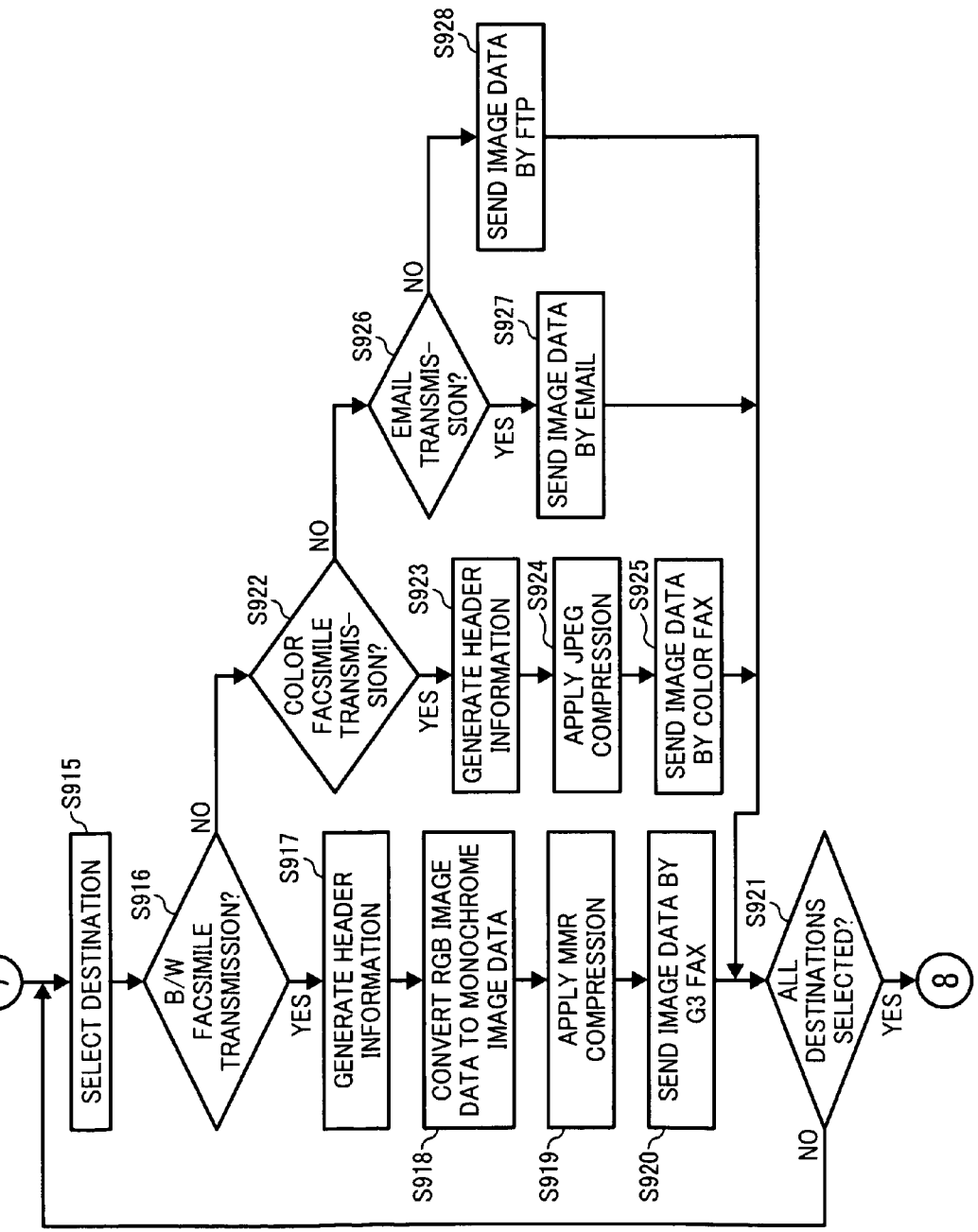

APPARATUS, SYSTEM, AND METHOD OF COMMUNICATION

CROSS-REFERENCE TO RELATED APPLICATIONS

This patent application is based on and claims priority under 35 U.S.C. §119 to Japanese Patent Application No. 2008-060460, filed on Mar. 11, 2008, in the Japanese Patent Office, the disclosure of which is hereby incorporated herein by reference.

FIELD OF THE INVENTION

The present invention generally relates to an apparatus, system, and method of communication, and more specifically relate to an apparatus, system, and method of sending image data from one destination to another destination.

BACKGROUND

A communication system may be provided, which includes an image data transmission apparatus and a terminal, which are connected through a network. The terminal may send a fax job request to the image data transmission apparatus, requesting the image data transmission apparatus to send image data to a specific destination via facsimile. In such case, the terminal sends the image data in the form of monochrome image such as in the form of MMR image data to reduce the data size of the image data to be transmitted through the network, for example, as described in the Japanese Patent Application Publication Nos. 2005-210531, and 2007-316854.

However, when the image data is received in the form of monochrome image, the image data transmission apparatus is not able to send the image data in the form of color image to the specific destination even when the image data transmission apparatus is capable of sending the color image data.

On the other hand, when the terminal sends the image data to the image data transmission apparatus in the form of color image, the network load of the communication system increases.

SUMMARY

Example embodiments of the present invention include an apparatus, method, and system each capable of determining which one of monochrome image data and color image data is desired according to a user instruction, and generating the image data in the desired format.

Example embodiments of the present invention include an apparatus, method, and system each capable of determining which one of monochrome image data and color image data is desired according to a user instruction, and sending the image data in the desired format to a network.

In addition to the above-described example embodiments, the present invention may be practiced in various other ways.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 4 is an illustration for explaining a fax transmission screen displayed by the computer of FIG. 3, according to an example embodiment of the present invention;

FIGS. 17A and 17B are flowchart illustrating operation of processing a fax job according to a fax request received from the computer of FIG. 3, performed by the multifunctional apparatus of FIG. 2, according to an example embodiment of the present invention;

FIG. 18 is an illustration for explaining image data having a cover sheet;

Figure 1:
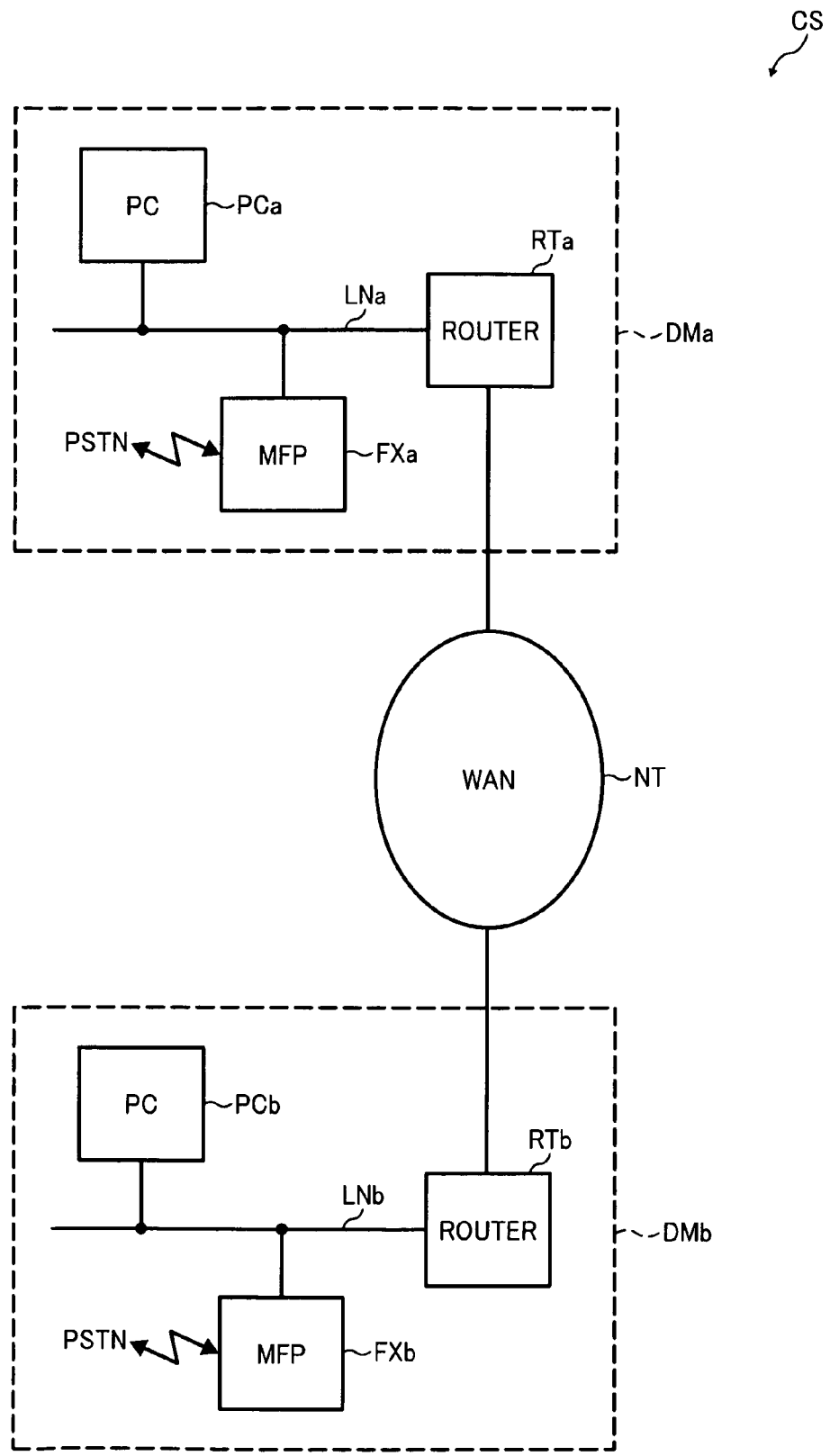
FIG. 1 is a schematic block diagram illustrating a configuration of a communication system according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring to FIG. 1, a configuration of a communication system CS is explained according to an example embodiment of the present invention. The communication system CS includes a first network DMa and a second network DMb, which are connected through a wide area network (WAN) NT. In this example, the WAN NT may include the Internet. The first network DMa includes a first personal computer PCa, a first router RTa, and a first multifunctional apparatus (MFP) FXa, which are connected through a first local area network (LAN) LNa. The second network DMb includes a second personal computer PCb, a second router RTb, and a second multifunctional apparatus (MFP) FXb, which are connected thorough a second local area network (LAN) LNb. The first router RTa and the second router RTb respectively connect the first LAN LNa and the second LAN LNb to the WAN NT such that any apparatus provided on the first network DMa and any apparatus provided on the second network DMb are communicable through the WAN NT. The first MFP FXa and second MFP FXb are each capable of communicating with any other apparatus provided on the communication system CS via a network such as the LAN LNa, the LAN LNb, or the WAN NT.

For simplicity, in this example, the first and second personal computers PCa and PCb, the first and second MFPs FXa and FXb, the first and second routers RTa and RTb, and the first and second LANs LNa and LNb are each collectively referred to as the PC, the MFP FX, the router RT, and the LAN LN.

The PC is provided with a plurality of functions including the data generating function, the fax request generating function, the print request generating function, the management information base (MIB) obtaining function, and the communication function.

The data generating function generates data such as document data using any desired data generating software, which may be installed onto the PC. The fax request generating function generates a fax request that requests the MFP FX to send desired data from one destination to another destination, and sends the fax request to the MFP FX through the LAN LN. The print request generating function generates a print request that requests the MFP FX to print desired data to generate a printed sheet, and sends the print request to the MFP FX through the LAN LN. The MIB obtaining function receives MIB information from the MFP FX through the LAN LN. The communication function communicates with any other apparatus provided on the communication system CS via the LAN LN or the WAN NT.

The MFP FXa and FXb, which may be collectively referred to as the MFP FX, are each provided with a plurality of functions including the Group 3 facsimile (G3 fax) communication function, the color fax communication function, the job management function, the printing function, the server function, and the email function.

The G3 fax communication function transmits or receives image data through a telephone communication line such as a public switched telephone network (PSTN). In this example, the G3 fax communication function may be referred to as the black/white fax communication function. The color fax communication function transmits or receives image data through the LAN LN or the WAN NT. The job management function receives a request for performing a specific job from the PC, or sends the MIB information to the PC through the LAN LN. The printing function receives a print request from the PC, and performs a print job according to the print request to generate a printed output. The server function provides a file transfer protocol (FTP) server function, which receives a data file such as image data from the PC for storage in a memory or sends a data file stored in the memory to the PC. The email function transmits or receives email data, which may be attached with image data, to or from any apparatus such as the PC through the LAN LN or the WAN NT. For the color fax communication function, call signaling is performed based on the standardized procedure such as ITU-T Recommendation H.323 or Session Initiation Protocol (SIP), while data exchange such as data transfer is performed based on a machine-specific procedure.

Figure 2:
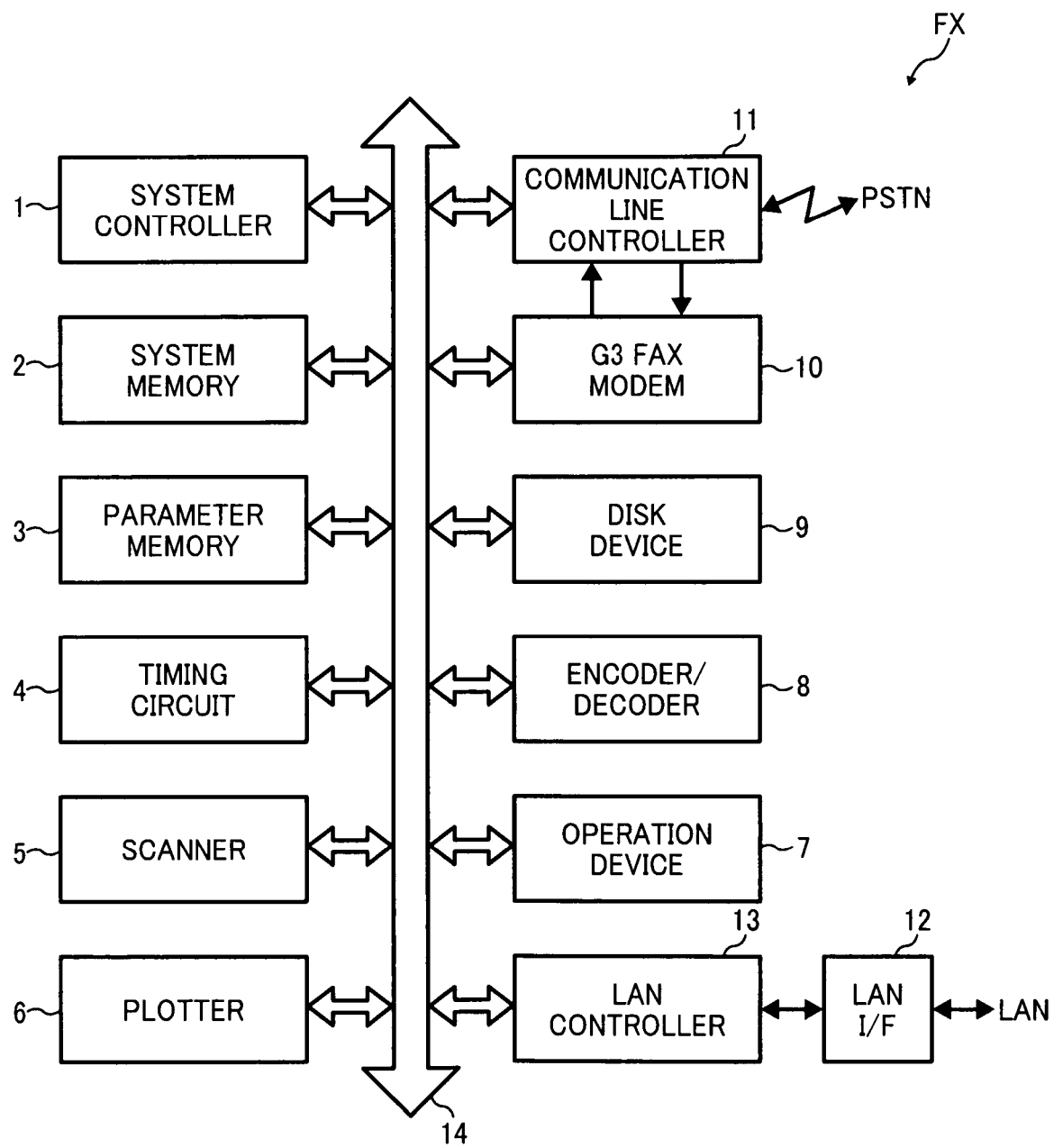
FIG. 2 is a schematic block diagram illustrating a structure of a multifunctional apparatus provided in the communication system of FIG. 1, according to an example embodiment of the present invention.

Referring to FIG. 2, a structure of the MFP FX is explained according to an example embodiment of the present invention. The MFP FX includes a system controller 1, system memory 2, parameter memory 3, timing circuit 4, scanner 5, plotter 6, operation device 7, encoder/decoder 8, disk device 9, G3 facsimile (fax) modem 10, communication line controller 11, a local area network (LAN) interface (I/F) 12, and a local area network (LAN) controller 13, which are coupled or connected through a system bus 14.

The system controller 1 controls operation of the MFP FX including operation of performing the G3 fax communication function, operation of performing the color fax communication function, operation of performing the printing function, operation of performing the server function, and operation of performing the email function. The system memory 2 stores an operation control program to be executed by the system controller 1, and various data to be used by the system controller 1 when the system controller 1 is caused to perform operation according to the operation control program. The system memory 2 may also function as a work area of the system controller 1. The parameter memory 3 stores various data specific to the MFP FX. The timing circuit 4 outputs time information regarding the current date and/or time.

The scanner 5 reads an original image into image data at a predetermined resolution. The scanner 5 may be any desired type of scanner, which may be additionally provided with an automatic document feeder (ADF) that feeds an original document to an image reading section. The plotter 6 prints image data onto a recording sheet at a predetermined resolution using any desired image forming method, and outputs the printed sheet. The operation device 7 provides various operation keys to allow the user to operate the MFP FX, or provides a display to display various information to the user. In one example, the operation device 7 may be implemented by an operation panel provided with a touch panel.

The encoder/decoder 8 encodes the image data or decodes the encoded image data. For example, as described below, the encoder/decoder 8 may compress image data to be transmitted using the MMR compression method or JPEG compression method. In another example, the encoder/decoder 8 may decompress image data received from the network. The disk device 9 may store various data such as the encoded data generated by the encoder/decoder 8, or other data files. In this example, the disk device 9 is implemented by a magnetic disk device. Alternatively, any desired type of storage device may be used as the disk device 9.

The G3 fax modem 10 allows the MFP FX to communicate with the other apparatus via facsimile in compliance with the ITU-T Recommendations T.30 and T.4. The G3 fax modem 10 provides a low-speed modem function that transmits or receives transmission signal information such as information regarding a protocol suite at the V.21 data transmission rate, and a high-speed modem function that transmits or receives data such as image data at the data transmission rate of V.17, V.34, V.29, or V.27ter.

The communication line controller 11 allows the MFP FX to connect to the telephone communication line such as the PSTN. The communication line controller 11 is provided with an automatic calling unit, which automatically controls transmission or receipt of a calling signal by the MFP FX.

The LAN interface 12 allows the MFP FX to connect to the LAN. The LAN controller 13 controls communication between the MFP FX and any other apparatus on the LAN according to a predetermined protocol suite.

As illustrated in FIG. 2, the above-described devices of the MFP FX are communicated with one another through the system bus 14. The communication line controller 11 and the G3 fax modem 10 are directly communicable with each other.

Figure 3:
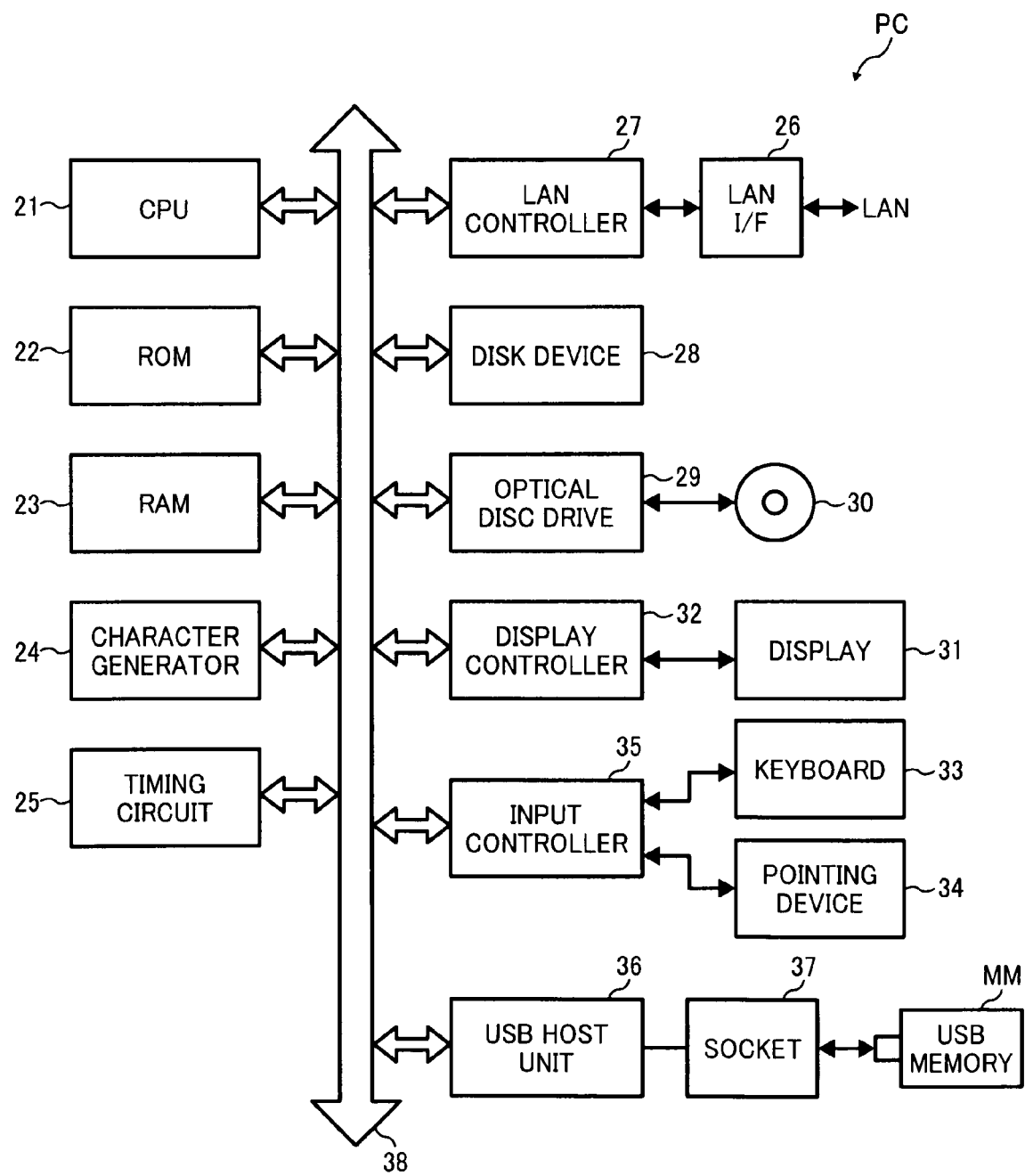
FIG. 3 is a schematic block diagram illustrating a structure of a computer provided in the communication system of FIG. 1, according to an example embodiment of the present invention.

Referring now to FIG. 3, a structure of the PC is explained according to an example embodiment of the present invention. The PC includes a central processing unit (CPU) 21, read only memory (ROM) 22, random access memory (RAM) 23, character generator 24, timing circuit 25, local area network (LAN) interface (I/F) 26, local area network (LAN) controller 27, disk device 28, optical disc drive 29, display 31, display controller 32, input controller 35, and a universal serial bus (USB) host unit 36, which are coupled or connected through an internal bus 38. Through the internal bus 38, the above-described devices are communicable with one another.

The CPU 21 controls operation of the PC. The ROM 22 stores various programs and/or data to be used by the CPU 21. For example, the ROM 22 may store an operation control program, which causes the CPU 21 to perform operation according to the operation control program. The RAM 23 functions as a work area of the CPU 21.

The character generator 24 generates character data, which may be displayed to the user through the display 31. The timing circuit 25 outputs time information regarding the current date and/or time. The LAN I/F 26 allows the PC to connect to the LAN. The LAN controller 27 controls communication between the PC and any other apparatus on the LAN using a predetermined protocol suite.

The disk device 28 may store various data including, for example, various application programs, work data, file data, encryption keys to be used for decoding data that has been encrypted using the public encryption method, or image data. The optical disc drive 29 reads or writes data from or onto a removable optical disc 30 such as CD-ROM or DVD. The display 31 displays a screen, which may be used by the user to operate the PC. The display 31 may be implemented, for example, a liquid crystal display (LCD) or a cathode ray tube (CRT). The display controller 32 controls information to be displayed through the display 31.

As illustrated in FIG. 3, the input controller 35 is connected to a keyboard 33 and a pointing device 34. The keyboard 33 allows the user to input a user instruction using various keys each corresponding to a specific character, alphabet, numeral, symbol etc. The pointing device 34 allows the user to point at a desired position on the screen displayed by the display 31. The pointing device 34 may be implemented by, for example, a mouse or a pointing pen. The input controller 35 receives information input by the user through the keyboard 33 or the pointing device 34, and sends such information to the other device of the PC.

The USB host unit 36 allows the PC to communicate with the other apparatus based on the USB technology. The USB host unit 36 is provided with a socket 37 to which a USB memory MM may be inserted.

In one example operation, the user at the PC may instruct the PC to send a print request to the MFP FX, which causes the MFP FX to print data specified by the user using the printing function of the MFP FX. For example, the user at the PC may generate document data using the document generating function of the PC. In order to print the document data, the user may input a request through a driver user interface screen displayed on the display 31 of the PC according to a device driver, such as a printer driver, installed onto the PC. When the user instruction is input, the printer driver of the PC may generate a print request, and sends the print request to the MFP FX through the LAN. Together with the print request, the PC may send the document data to be printed to the MFP FX.

In another example operation, the user at the PC may instruct the PC to send a fax request to the MFP FX, which causes the MFP FX to send data specified by the user from one destination to another destination using any one of the black/white fax communication function, the color fax communication function, the email function, and the server function, of the MFP FX. For example, the user at the PC may generate document data using the document generating function of the PC. In order to send the document data from the PC to a specific destination, the user may input a request through a driver user interface screen displayed on the display 31 of the PC according to a device driver installed onto the PC. When the user instruction is input, the PC may generate a fax request, and sends the fax request to the MPF FX through the LAN or the communication line. Together with the fax request, the PC may send the document data to be printed to the MFP FX.

Referring now to FIG. 4, operation of receiving a user instruction regarding a fax request, performed by the PC, is explained according to an example embodiment of the present invention.

When the user selects to send data specified by the user from one destination to another destination through the driver user interface screen, the display 31 displays a fax transmission screen illustrated in FIG. 4. For the illustrative purpose, it is assumed that the user selects to send document data from the PC to a specific destination through the MFP FX. The fax transmission screen of FIG. 4 mainly includes a window DPa, a widow DPb, and a "Send" button BBa. The user presses the "Send" button BBa to instruct the PC to send a fax request to the MFP FX, which causes the MFP FX to send the document data to the specific destination according to information input, for example, through the window DPa.

The window DPa includes a plurality of boxes each allowing the user to input information regarding the data transmission such as information regarding the destination to which the document data is transmitted, and the method of transmitting the document data ("transmission type"). The plurality of boxes includes a transmission type section DL, a destination section including a check box BXa and a data entry box BXb, and an "Add" button BBb.

The transmission type section DL, which is provided in the form of drop-down list, allows the user to specify a transmission type including the black/white facsimile transmission type for sending the document data using the black/white fax communication function of the MFP FX, the color facsimile transmission type for sending the document data using the color fax communication function of the MFP FX, the email transmission type for sending the document data using the email function of the MFP FX, and the FTP transmission type for sending the document data using the server function of the MFP FX.

The destination section allows the user to input information regarding a destination to which the document data is sent. The check box BXa allows the user to select the use of an address book function, which may be provided by the MPF FX. The data entry box BXb allows the user to input text data specifying a destination to which the document data is sent, such as a destination facsimile number or a destination address. When the check box BXa is selected, the data entry box BXb is automatically caused to display a short-cut number, which is previously registered in the MFP FX so as to correspond to at least one facsimile number or address. When the check box BXa is not selected, the data entry box BXb displays the facsimile number or the address, which is input by the user using, for example, the keyboard 33.

The "Add" button BBb allows the user to add information input through the screen DPa to a fax job list that is displayed on the screen DPb. When the "Add" button BBb is selected, the PC generates a new fax job according to information that is currently displayed on the screen DPa, and adds the new fax job to the fax job list that is stored in a memory of the PC. At this time, the new fax job that has been added is displayed on the screen DPb. For example, the fax job list of FIG. 4 may display information regarding the destination including the name of the receiver, the facsimile number or the address of the receiver, and the total number of fax jobs to be processed, etc. According to the fax job list, the PC sends a fax request to the MFP FX to cause the MFP FX to send the document data to a specified destination using any one of the functions of the MFP FX that is specified by the transmission type selected by the user.

In this example, using the above-described boxes displayed on the window DPa, the user at the PC may input any desired number of destinations. In such case, the transmission type may be set for each one of the destinations entered by the user.

Figure 5:
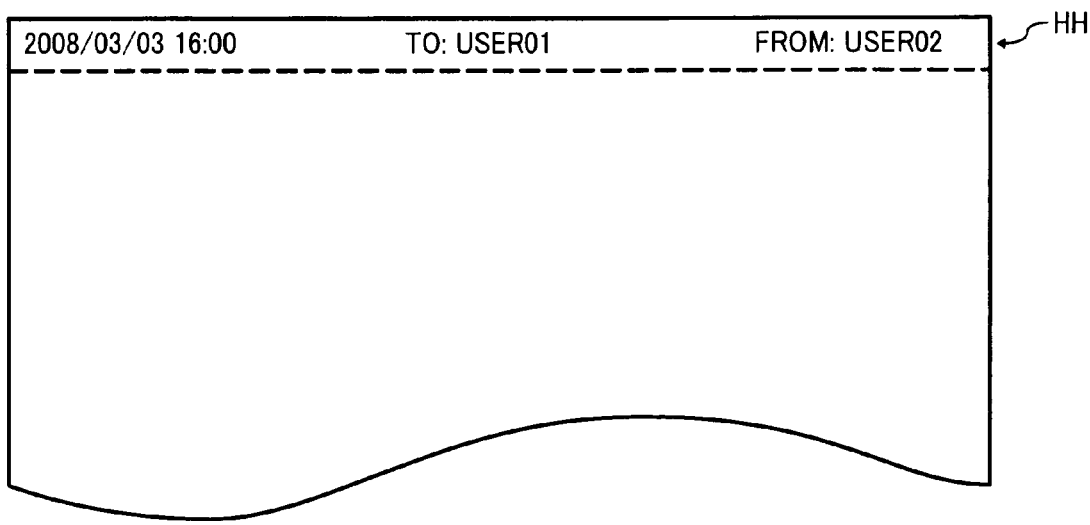
FIG. 5 is an illustration for explaining header information, which is added to data to be transmitted, according to an example embodiment of the present invention.

When the fax job is generated, the PC converts the document data to be transmitted to the PC to image data. In such case, the PC may add header information HH to the document data to be transmitted, for example, as illustrated in FIG. 5. The header information includes, for example, information regarding the date and/or time of transmission, information regarding the destination ("To: User 01") to which the data is transmitted through the MFP FX, or information regarding the sender requesting fax transmission ("From: User 02"). The header information HH may include any other type of information including, for example, the total number of pages to be transmitted.

Figure 6A:
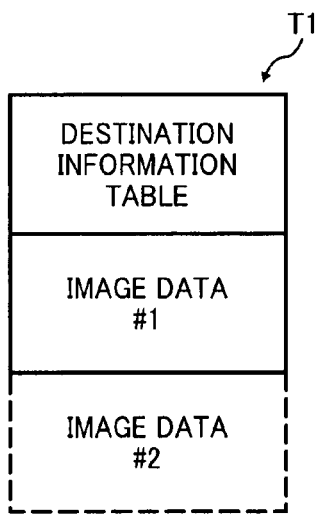
FIG. 6A is an illustration for explaining fax job information.

In order to generate the image data including the header information HH, the PC refers to fax job information, which is stored in a memory according to the user input received through the fax transmission screen of FIG. 4 when the new fax job is created. As illustrated in FIG. 6A, the fax job information mainly includes information regarding one or more destinations to which the document data is to be sent ("the destination information table T1"), and image data to be transmitted such as image data #1 and image data #2. The image data may correspond to any number of pages of document data. In this example illustrated in FIG. 6A, the image data #1 and the image data #2 each correspond to one page of document data.

Figure 6B:
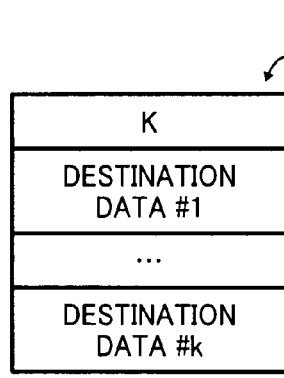
FIG. 6B is an illustration for explaining a destination information table of the fax job information of FIG. 6A.

As illustrated in FIG. 6B, the destination information table T1 of FIG. 6A includes information regarding the number "k" of destinations, and destination information regarding the destination such as destination data #1 to destination data #k.

Figure 6C:
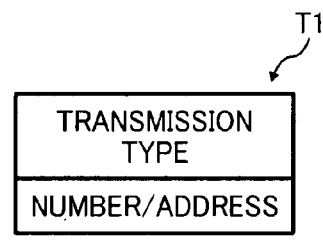
FIG. 6C is an illustration for explaining destination information of the destination information table of FIG. 6B.

As illustrated in FIG. 6C, the destination information of FIG. 6B, such as any one of the destination data #1 to #k, includes information regarding the transmission type ("TRANSMISSION TYPE"), and information specifying the location of the destination on the network such as the facsimile number or address of the destination ("NUMBER/ADDRESS"). In this example, the transmission type information indicates one of the black/white facsimile transmission type, the color facsimile transmission type, the email transmission type, and the FTP transmission type, which is selected through the transmission type section DL of FIG. 4 for each destination.

Figure 6D:
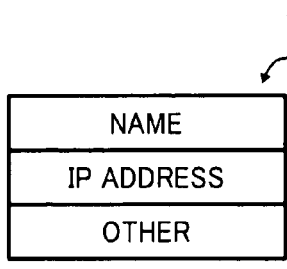
FIG. 6D is an illustration for explaining a management information table.

Further, in this example, the PC obtains the MIB information from the MFP FX at a desired timing, and stores the MIB information in an MFP management table T2 of FIG. 6D. The MFP management table T2 of FIG. 6D includes identification information regarding the MFP FX such as the machine name ("NAME"), a network address of the MFP FX such as the IP address ("IP ADDRESS"), and other information that is specific to the MFP FX ("OTHER").

Figure 6E:
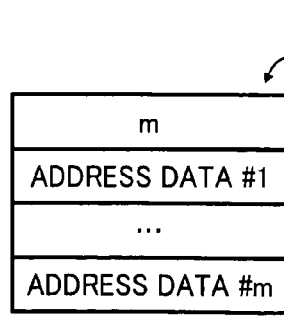
FIG. 6E is an illustration for explaining an address information table.

In this example, the PC may further obtain information regarding one or more addresses that are previously registered using the address book function of the MFP FX at any desired timing, and stores the obtained information in an address information table T3 of FIG. 6E. The address information table T3 of FIG. 6E includes information regarding the number "m" of destinations that are registered, and address information that may be used to specify the address of one or more destinations such as address data #1 to address data #m.

Figure 6F:
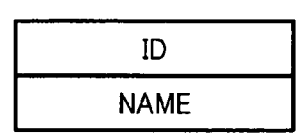
FIG. 6F is an illustration for explaining address information of the address information table.

As illustrated in FIG. 6F, the address information of FIG. 6E, such as any one of the address data #1 to #m, includes information regarding the ID ("ID") that is assigned to each destination being registered, and information regarding the name ("NAME") that is used to identify each destination being registered. The ID being assigned to the destination may be any desired code, which may be used as a short-cut number as described above referring to FIG. 4. Alternatively, the user may assign a specific name to each destination, and use as the short-cut number. The name of FIG. 6F may correspond to the machine name, or the user name, of each destination, which is stored in a memory of the MFP FX so as to correspond to information regarding the specific location of each destination.

In this example, the PC may obtain the MIB information or address information from the MFP FX at any desired timing, using the Simple Network Management Protocol (SNMP). The PC may obtain any data from the MIB information or address information as needed.

Figure 7:
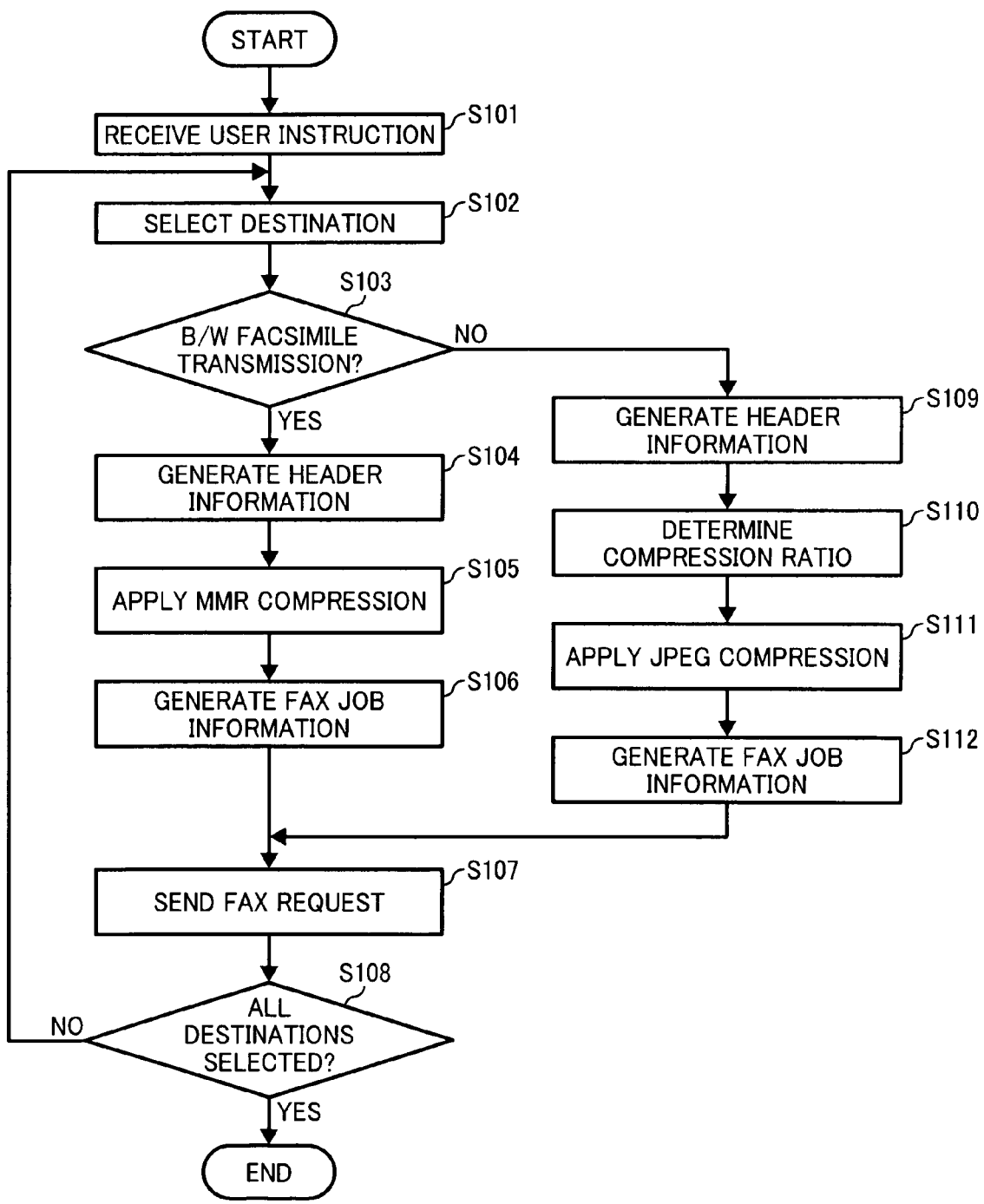
FIG. 7 is a flowchart illustrating operation of generating a fax job and sending a fax request to the multifunctional apparatus of FIG. 2, performed by the computer of FIG. 3, according to an example embodiment of the present invention.

Referring now to FIG. 7, operation of generating a fax job according to a user instruction and sending a fax request to the MFP FX, performed by the PC, is explained according to an example embodiment of the present invention.

At S101, the PC receives a user instruction, which requests the PC to send a fax request to the MFP FX, through the facsimile transmission screen of FIG. 4 as described above referring to FIG. 4. In this example, it is assumed that one of the black/white facsimile transmission type and the color facsimile transmission type is selected for each destination. Further, it is assumed that information regarding the destination is input directly by the user through the data entry box BXb using the keyboard 33.

At S102, the PC selects one destination, from one or more destinations each has been selected or entered by the user.

At S103, the PC determines whether the selected destination has the black/white facsimile transmission type. When it is determined that the selected destination has the black/white facsimile transmission type ("YES" at S103), the operation proceeds to S104. When it is determined that the selected destination has the color facsimile transmission type ("NO" at S103), the operation proceeds to S109.

At S104, the PC determines that the data is to be transmitted in the form of monochrome image. The PC further generates header information HH using information regarding the current date/time obtainable from the timing circuit 25, the name of the selected destination obtainable from the fax job information such as the destination information table T1 of FIGS. 6A to 6C, and the name of the PC or the name of the user at the PC. The generated header information HH is put before the image data to be transmitted. In this example, when more than one page of image data is to be transmitted, the header information HH is generated for each page of image data and inserted before each page of image data. In such case, the header information HH may include information regarding the page number of each page.

At S105, the PC applies MMR compression to the image data.

At S106, the PC generates fax job information for the image data to be transmitted, which includes information regarding the destination that is specified by the user obtainable from the destination information table T1, and the image data to be transmitted.

At S107, the PC sends the fax request to the MFP FX through the LAN LN, which requests the MFP FX to send the image data to the specified destination according to the fax job information. For example, the CPU 21 may cause the LAN controller 27 to transmit the fax request through the LAN I/F 26.

At S108, the PC determines whether all destinations have been selected. When it is determined that all destinations have been selected ("YES" at S1108), the operation ends. When it is determined that all destination have not been selected ("NO" at S108), the operation returns to S102 to select another destination and perform the above-described operation to send a fax request for the selected destination to the MFP FX.

At S103, when it is determined that the selected destination has the color facsimile transmission type ("NO" at S103), the operation proceeds to S109 to determine that the data is to be transmitted in the form of color image. The PC further generates header information HH using information regarding the current date/time obtainable from the timing circuit 25, the name of the selected destination obtainable from the fax job information such as the destination information table T1 of FIGS. 6A to 6C, and the name of the PC or the user at the PC. The generated header information HH is put before the image data to be transmitted in a substantially similar manner as described above referring to S104.

S110, the PC determines a compression ratio of the image data, for example, based on the network load or the available memory space of the MFP FX. For example, as the network load increases or as the available memory decreases, the compression ratio increases. As the network load decreases or as the available memory space increases, the compression ratio decreases.

At S111, the PC applies JPEG compression to the image data using the compression ratio determined at S110. In this example, the JPEG compression is applied to the image data, one page by one page.

At S112, the PC generates fax job information for the image data to be transmitted, which includes information regarding the destination that is specified by the user obtainable from the destination information table T1, and the image data to be transmitted. When the fax job information is generated, the operation proceeds to S108 to send the fax request as described above, and the operation ends.

Figure 8:
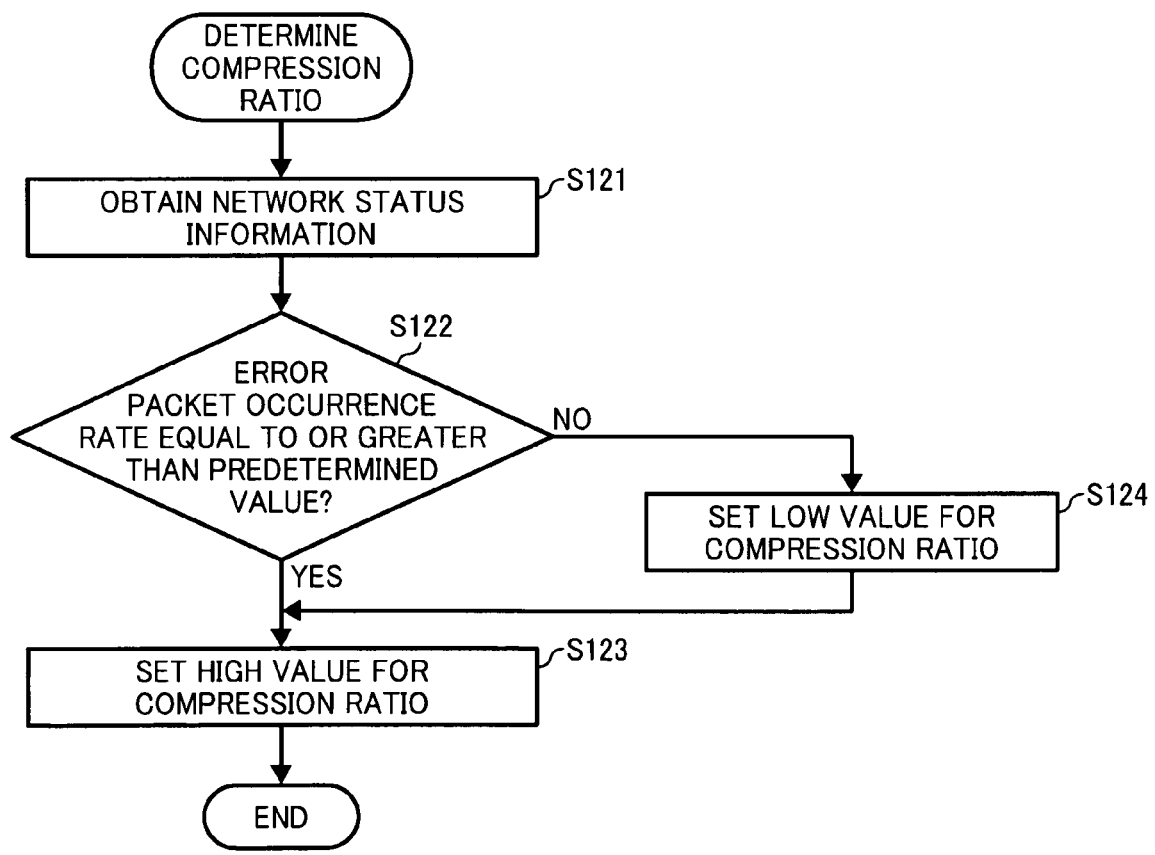
FIG. 8 is a flowchart illustrating operation of determining a compression ratio of image data, performed by the computer of FIG. 3, according to an example embodiment of the present invention.
Figure 9:
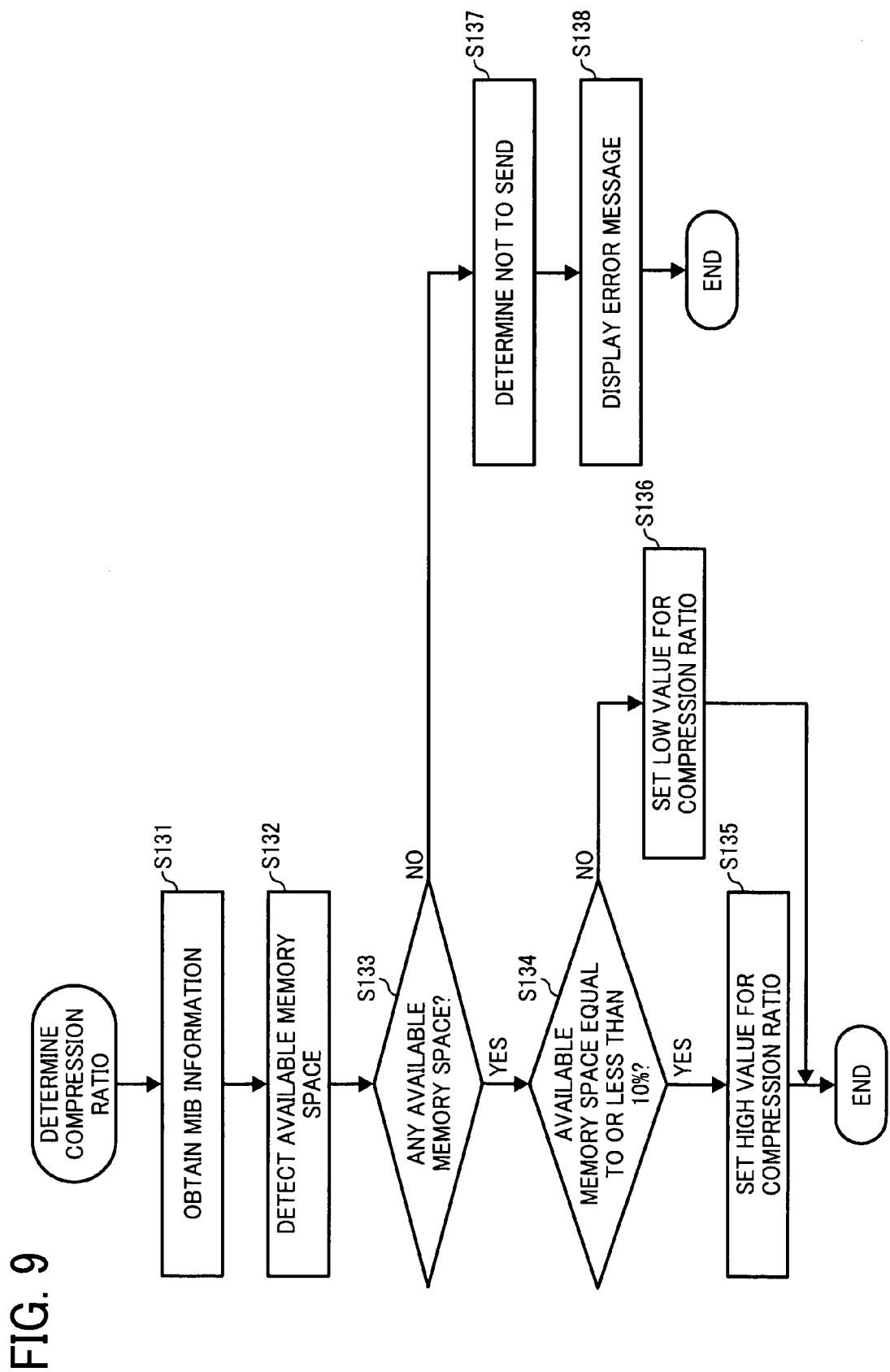
FIG. 9 is a flowchart illustrating operation of determining a compression ratio of image data, performed by the computer of FIG. 3, according to an example embodiment of the present invention.

Referring now to FIGS. 8 and 9, operation of determining the compression ratio, which is performed by the PC at S110 of FIG. 7, is explained according to an example embodiment of the present invention.

Referring to FIG. 8, at S121, the PC obtains information regarding the network status of the MPF FX, such as information regarding the occurrence rate of an error packet that has been reported to the MFP FX, using a netstat command.

At S122, the PC determines whether the error packet occurrence rate is equal to or greater than a predetermined value. When it is determined that the error packet occurrence rate is equal to or greater than the predetermined value ("YES" at S122), the operation proceeds to S123. When it is determined that the error packet occurrence rate is less than the predetermined value ("NO" at S122), the operation proceeds to S124.

At S123, the PC sets the compression ratio to be a high value, which may be previously determined, for example, to be 95%, and the operation ends to proceed to S111 of FIG. 7.

At S124, the PC sets the compression ratio to be a low value, which may be previously determined, for example, to be 40%, and the operation ends to proceed to S111 of FIG. 7.

As described above referring to FIG. 8, the PC is capable of adjusting the compression ratio according to the network status of the MFP FX. When the network load of the MFP FX is determined to be high, the compression ratio is increased such that the resultant image data to be transmitted is small in data size. This may prevent the overall processing speed of the communication system CS to be slowed down, which may be otherwise caused due to the high network load of the MFP FX.

Referring to FIG. 9, at S131, the PC obtains the MIB information received from the MFP FX from the memory of the PC. Alternatively, the PC may obtain the MIB information from the MFP FX.

AT S132, the PC obtains information regarding the available memory space of the MFP FX from the MIB information. In this example, the available memory space corresponds to the memory space to be used for storing a temporary file such as the memory space of the system memory 2 or the disk device 9 of the MFP FX.

At S133, the PC determines whether there is any available memory space. When it is determined that there is the available memory space ("YES" at S133), the operation proceeds to S134. When it is determined that there is no available memory space ("NO" at S133), the operation proceeds to S137.

At S134, the PC determines whether the available memory space is less than 10% of the total memory space. When it is determined that the available memory space is less than 10% ("YES" at S134), the operation proceeds to S135. When it is determined that the available memory space is equal to or greater than 10% ("NO" at S134), the operation proceeds to S136.

At S134, the PC sets the compression ratio to be a high value, which may be previously determined, for example, to be 95%, and the operation ends to proceed to S111 of FIG. 7.

At S136, the PC sets the compression ratio to be a low value, which may be previously determined, for example, to be 40%, and the operation ends to proceed to S111 of FIG. 7.

When it is determined that there is no available memory space at S133 ("NO" at S133), the operation proceeds to S137 to determine that data cannot be sent to the MFP FX.

At S138, the PC may cause the display 31 to display an error message to the user, which reports the user that there is no available memory space for the MFP FX, and the operation ends without proceeding to S107 and S108 of FIG. 7.

As described above referring to FIG. 9, the PC is capable of adjusting the compression ratio according to the available memory space of the MFP FX. When the available memory space of the MFP FX is determined to be low, the compression ratio is increased such that the resultant image data to be transmitted is small in data size. This suppresses the occurrence of error in processing a fax request, which may be otherwise caused due to the unavailable memory space.

Figure 10:
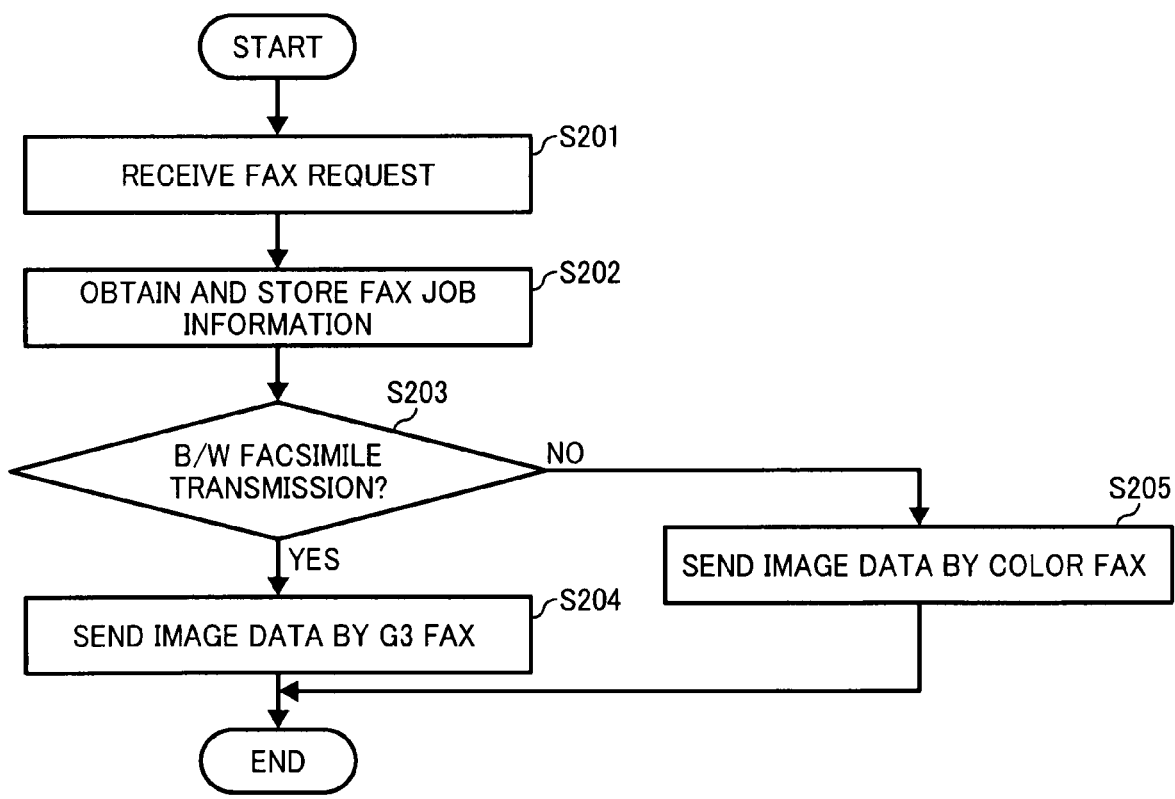
FIG. 10 is a flowchart illustrating operation of processing a fax job according to a fax request received from the computer of FIG. 3, performed by the multifunctional apparatus of FIG. 2, according to an example embodiment of the present invention.

Referring to FIG. 10, operation of processing a fax job according to the fax request received from the PC, performed by the MFP FX is explained according to an example embodiment of the present invention. The operation of FIG. 10 is performed for each one of a plurality of destinations specified by the user when the user specifies more than one destination. More specifically, the operation of FIG. 10 is performed every time the MFP FX receives the fax request, which is generated and sent by the PC as described above referring to FIG. 7.

At S201, the MFP FX receives the fax request from the PC, which requests the MFP FX to perform the fax job according to the fax job information sent together with the fax request.

At S202, the MFP FX stores the fax job information in a memory.

At S203, the MFP FX determines whether the transmission type is the black/white facsimile transmission type. As described above referring to FIGS. 6A to 6C, the transmission type for the destination is obtainable from the fax job information. When it is determined that the transmission type is the black/white facsimile transmission type ("YES" at S203), the operation proceeds to S204. When it is determined that the transmission type is the color facsimile transmission type ("NO" at S203), the operation proceeds to S205.

At S204, the MFP FX causes the communication line controller 11 to call the destination specified by the fax job information, for example, using the facsimile number obtainable from the fax job information. The communication line controller 11 further sends the specified image data to the specified destination using the G3 fax modem 10 through the PSTN. The image data to be transmitted, which is received from the PC in the form of MMR monochrome image, is obtainable from the fax job information.

At S205, the MFP FX causes the LAN controller 13 to call the destination specified by the fax job information based on the standardized procedure such as ITU-T Recommendation H.323 or SIP, for example, using the facsimile number or the address obtainable from the fax job information. When the connection with the destination is established, such as through a communication path, the MFP FX sends the image data to the destination using a predetermined procedure that is specific to the MFP FX. The image data be transmitted, which is received from the PC in the form of JPEG color image, is obtainable from the fax job information.

As described above referring to FIGS. 7 and 9, the PC determines a desired format of image data according to the transmission type specified by the user, generates the image data having the determined format, and sends the image data to the MFP FX in the determined format. Since the image data is sent in the desired format, the MFP FX does not have to determine a format to be used or apply further processing to image data, before sending the image data to a specific destination.

Further, the PC sends the image data to the MFP FX in the compressed format, using a compression method that is determined according to the specified transmission type. This reduces the network load of the communication system CS. Further, the MFP FX that receives the image data in the compression format does not have to apply compression to the image data before sending the image data to a specific destination.

Further, the PC generates the header information HH for each destination, and adds the header information HH specific to each destination to the MFP FX to the image data before sending the image data to the MFP FX. Since the image data that is received from the PC is provided with the header information, the MFP FX does not have to generate the header information HH or add the header information HH to the image data, before sending the image data to a specific destination.

Figure 11:
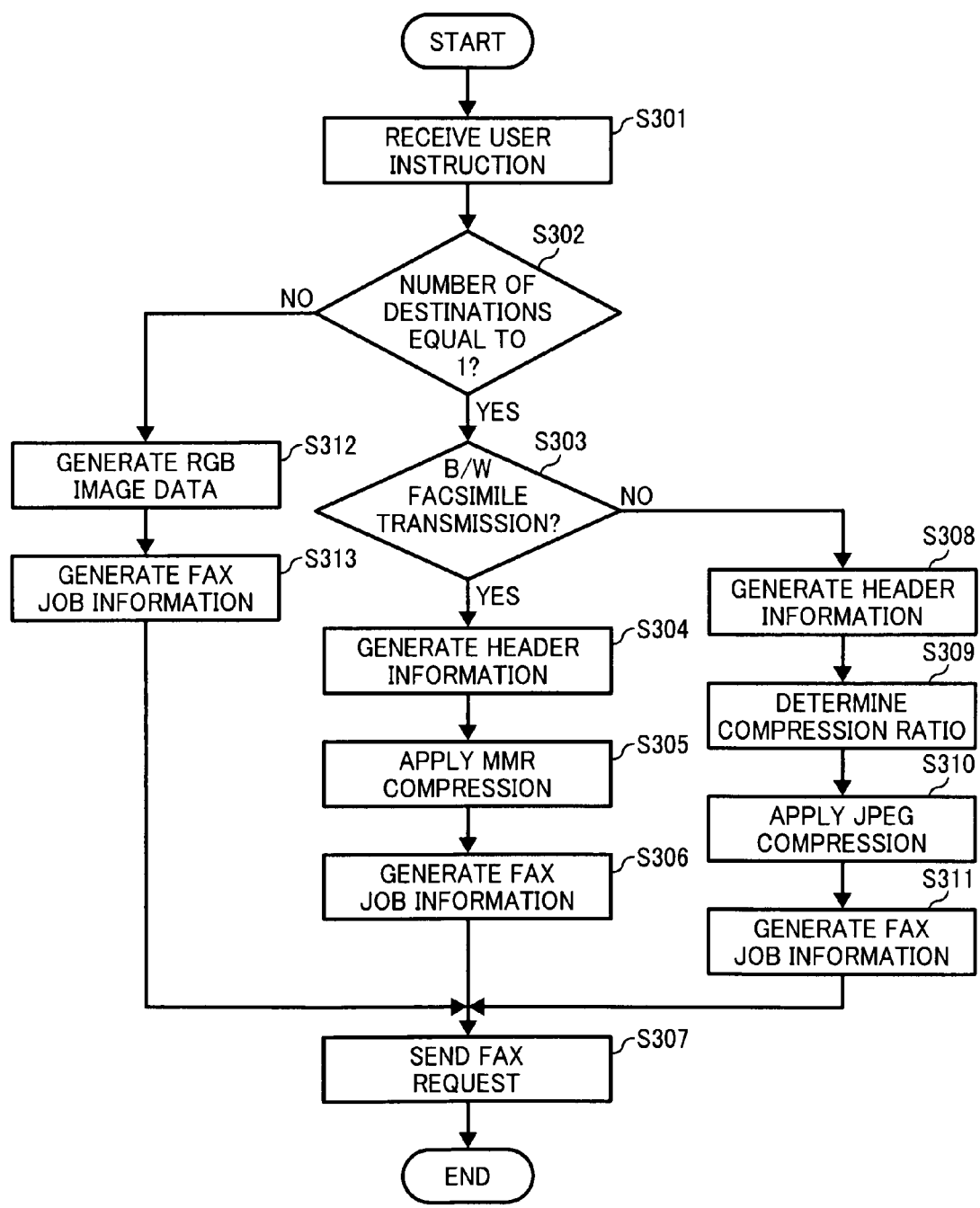
FIG. 11 is a flowchart illustrating operation of generating a fax job and sending a fax request to the multifunctional apparatus of FIG. 2, performed by the computer of FIG. 3, according to an example embodiment of the present invention.

Referring now to FIG. 11, operation of generating a fax job according to a user instruction and sending a fax request to the MFP FX, performed by the PC, is explained according to an example embodiment of the present invention.

At S301, the PC receives a user instruction, which requests the PC to send a fax request to the MFP FX, through the facsimile transmission screen of FIG. 4 as described above referring to FIG. 4. In this example, it is assumed that one of the black/white facsimile transmission type and the color facsimile transmission type is selected for each destination.

Further, it is assumed that information regarding the destination is input directly by the user through the data entry box BXb using the keyboard 33.

At S302, the PC determines whether the number of destinations specified by the user is equal to 1. When it is determined that the number of destinations is 1 ("YES" at S302), the operation proceeds to S303. When it is determined that the number of destination is not 1 ("NO" at S302), the operation proceeds to S312.

At S303, the PC determines whether the destination has the black/white facsimile transmission type. When it is determined that the destination has the black/white facsimile transmission type ("YES" at S303), the operation proceeds to S304. When it is determined that the destination has the color facsimile transmission type ("NO" at S303), the operation proceeds to S308.

S304, S305, and S306 are performed in a substantially similar manner as described above referring to S104, S105, and S106 of FIG. 7.

S308, S309, S310, and S311 are performed in a substantially similar manner as described above referring to S109, S110, S111, and S112 of FIG. 7.

At S307, the PC sends the fax request to the MFP FX through the LAN LN, which requests the MFP FX to send the image data to the specified destination according to the fax job information. For example, the CPU 21 may cause the LAN controller 27 to transmit the fax request through the LAN I/F 26.

When it is determined that the number of destinations is greater than 1 ("NO" at S302), the operation proceeds to S312 to generate image data in the RGB format.

At S313, the PC generates fax job information for the image data to be transmitted, which includes information regarding the plurality of destinations that are specified by the user and information regarding the transmission type for each one of the plurality of destinations that are obtainable from the destination information table T1, and the image data to be transmitted. The operation proceeds to S307 to send the fax request and the operation ends. For example, referring back to FIGS. 6A to 6C, information regarding the plurality of destinations may be provided in the form of destination information table T1 including information regarding the transmission type for each destination. Further, in this example, the RGB image data to be transmitted is included as the image data to be used for the plurality of destinations.

Figure 12A:
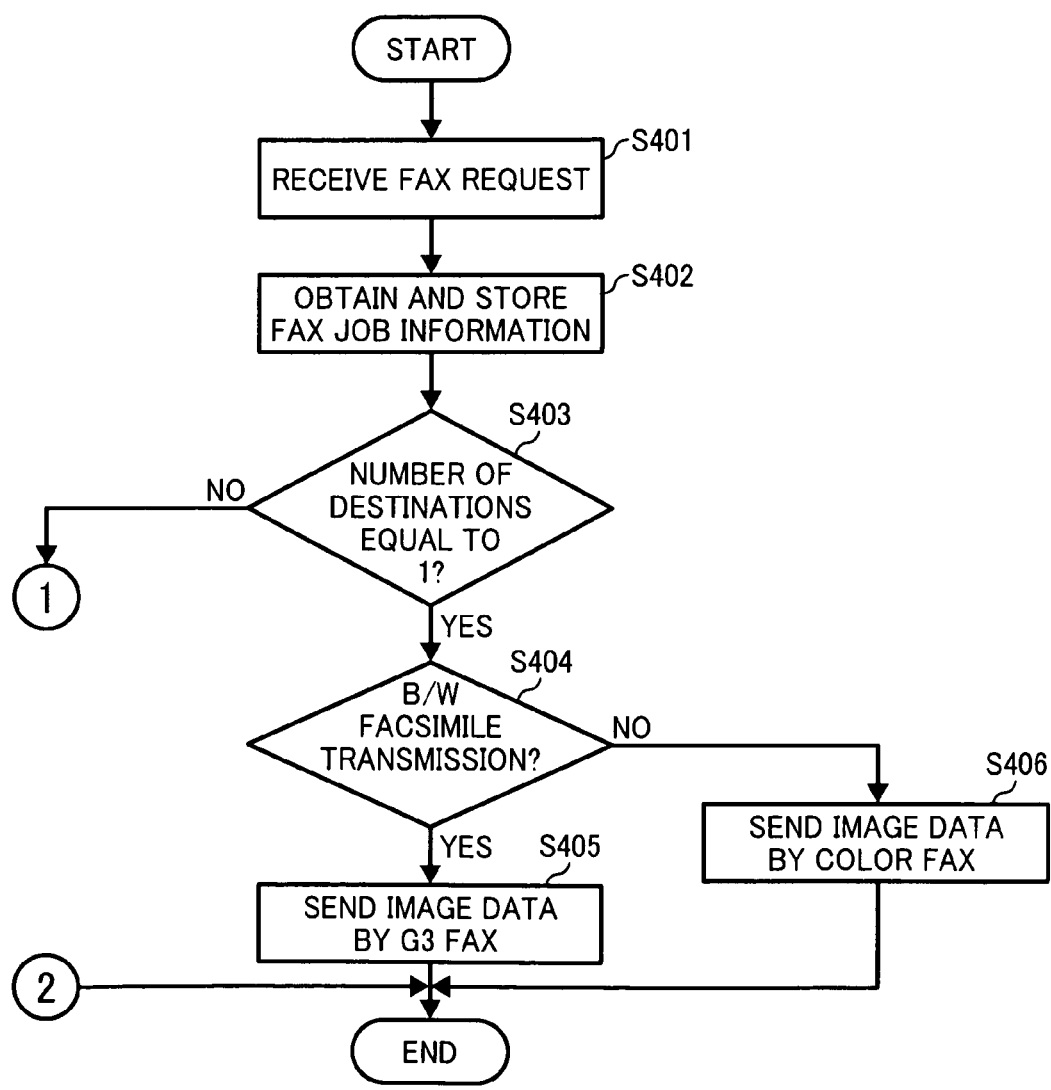
FIGS. 12A and 12B are a flowchart illustrating operation of processing a fax job according to a fax request received from the computer of FIG. 3, performed by the multifunctional apparatus of FIG. 2, according to an example embodiment of the present invention.
Figure 12B:
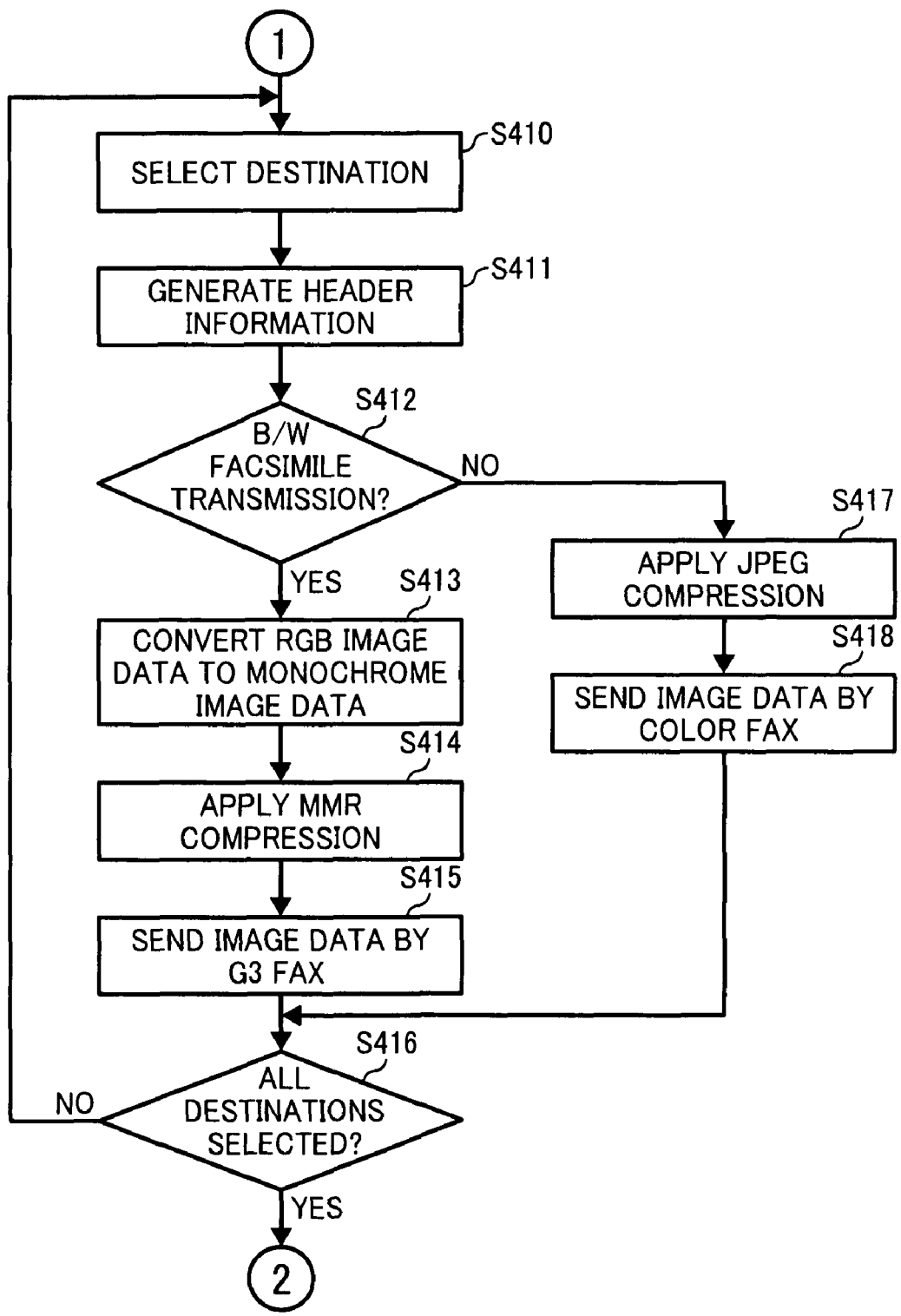

Referring to FIGS. 12A and 12B, operation of processing a fax job according to the fax request received from the PC, performed by the MFP FX is explained according to an example embodiment of the present invention.

Referring to FIG. 12A, at S401, the MFP FX receives the fax request from the PC, which requests the MFP FX to perform the fax job according to the fax job information sent together with the fax request.

At S402, the MFP FX stores the fax job information in a memory.

At S403, the MFP FX determines whether the number of destinations specified by the fax job information is equal to 1. When it is determined that the number of destinations is 1 ("YES" at S403), the operation proceeds to S404. When it is determined that the number of destinations is greater than 1 ("NO" at S403), the operation proceeds to S410 of FIG. 12B.

At S404, the MFP FX determines whether the transmission type is the black/white facsimile transmission type in a substantially similar manner as described above referring to S203 of FIG. 10. When it is determined that the transmission type is the black/white facsimile transmission type ("YES" at S404), the operation proceeds to S405. When it is determined that the transmission type is the color facsimile transmission type ("NO" at S404), the operation proceeds to S406.

At S405, the MPF FX causes the communication line controller 11 to send the image data to the specified destination through the PSTN using the G3 fax modem 10, in a substantially similar manner as described above referring to S204 of FIG. 10. The image data to be transmitted, which is received from the PC in the form of MMR monochrome image, is obtainable from the fax job information.

At S406, the MFP FX causes the LAN controller 13 to send the image data to the specified destination through the LAN, in a substantially similar manner as described above referring to S205 of FIG. 10. The image data be transmitted, which is received from the PC in the form of JPEG color image, is obtainable from the fax job information.

When it is determined that the number of destinations is greater than 1 at S403 ("NO" at S403), the operation proceeds to S410 of FIG. 12B to perform operation illustrated in FIG. 12B.

At S410, the MFP FX selects one destination from the plurality of destinations specified by the user, which is obtainable from the fax job information.

At S411, the MFP FX generates header information HH using information regarding the current date/time obtainable from the timing circuit 4, the name of the selected destination obtainable from the fax job information, and the name of the PC or the user at the PC. The generated header information HH is put before the image data to be transmitted. In this example, it is assumed that the image data is received in the RGB format. In this example, when more than one page of image data is to be transmitted, the header information HH is generated for each page of image data and inserted before each page of image data. In such case, the header information HH may include information regarding the page number of each page.

At S412, the MFP FX determines whether the selected destination has the black/white facsimile transmission type. When it is determined that the selected destination has the black/white facsimile transmission type ("YES" at S412), the operation proceeds to S413. When it is determined that the selected destination has the color facsimile transmission type ("NO" at S412), the operation proceeds to S417.

At S413, the MFP FX determines that the data is to be transmitted in the form of monochrome image. The MFP FX converts the RGB image data to which the header information HH is added, to monochrome image data.

At S414, the MFP FX further applies MMR compression to the monochrome image data, and stores the MMR monochrome image data in a memory.

S413 and S414 may be performed for each page of image data, when the image data includes more than one page.

At S415, the MFP FX causes the communication line controller 11 to send the image data to the specified destination through the PSTN using the G3 fax modem 10, in a substantially similar manner as described above referring to S204 of FIG. 10.

At S416, the MFP FX determines whether all destinations have been selected. When it is determined that all destinations have been selected ("YES" at S416), the operation ends. When it is determined that all destination have not been selected ("NO" at S416), the operation returns to S410 to select another destination and perform the above-described operation to send the image data to the selected destination using the black/white fax communication function or the color fax communication function.

When it is determined that the transmission type is the color facsimile transmission type ("NO" at S412), the operation proceeds to S417 to apply JPEG compression to the RGB image data to which the header information HH is added at a predetermined compression ratio, and store the JPEG color image data in a memory. At S417, the compression ratio may be determined based on the network load or the available memory space of a destination apparatus in a substantially similar manner as described above referring to FIG. 8 or 9. Alternatively, the compression ratio may be previously set according to the default settings.

At S418, the MFP FX causes the LAN controller 13 to send the image data to the specified destination through the LAN, in a substantially similar manner as described above referring to S205 of FIG. 10.

As described above referring to FIGS. 11, 12A and 12B, the PC sends one fax request to the MFP FX, which requests the MFP FX to send the image data to one or more destinations specified by the user. This suppresses the network load of the communication system CS of FIG. 1 especially when a plurality of destinations are selected by the user.

In the above-described case, the PC sends the image data to be transmitted in the form of uncompressed color image such as in the RGB format, together with the destination information table T1, to the MFP FX. The image data is sent as the uncompressed color image data, since the MFP FX requires the uncompressed color image data in order to add header information to the image data. This suppresses the image quality of the image data to be low.

For example, if the image data is sent in the compressed format, such as in JPEG, the MFP FX needs to expand the JPEG compressed image data to obtain the uncompressed image data before adding header information HH. The MFP FX adds the header information HH to the uncompressed image data, and applies JPEG compression or MMR compression to the uncompressed image data before sending the image data to the destination. As compression and expansion are repeatedly applied, the image quality of the resultant image data may be lowered.

Further, since the image data is sent only once even when there is more than one destination, the network load of the communication system CS may be reduced.

Figure 13:
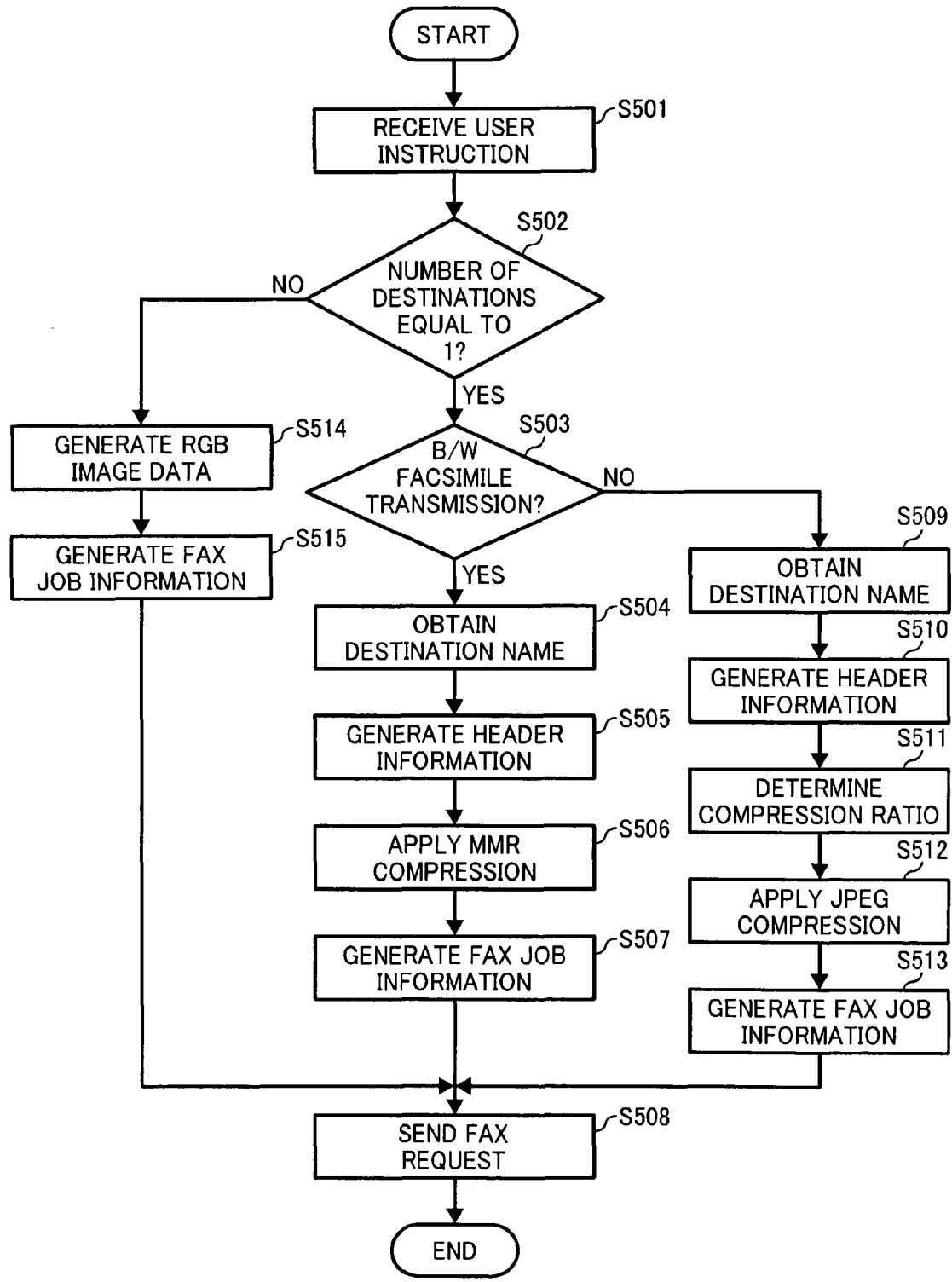
FIG. 13 is a flowchart illustrating operation of generating a fax job and sending a fax request to the multifunctional apparatus of FIG. 2, performed by the computer of FIG. 3, according to an example embodiment of the present invention.

Referring now to FIG. 13, operation of generating a fax job, performed by the PC, is explained according to an example embodiment of the present invention.

At S501, the PC receives a user instruction, which requests the PC to send a fax request to the MFP FX, through the facsimile transmission screen of FIG. 4 as described above referring to FIG. 4. In this example, it is assumed that one of the black/white facsimile transmission type and the color facsimile transmission type is selected for each destination. Further, it is assumed that the user inputs information regarding the destination using the address book function provided by the MFP FX. More specifically, referring back to FIG. 4, the user selects the check box BXa to cause the entry box BXb to automatically display a short-cut number that corresponds to one destination that is previously registered using the address book function of the MFP FX, and selects the short-cut number as a destination to which the image data is transmitted through the MFP FX.

At S502, the PC determines whether the number of destinations specified by the user is equal to 1. When it is determined that the number of destinations is 1 ("YES" at S502), the operation proceeds to S503. When it is determined that the number of destination is not 1 ("NO" at S502), the operation proceeds to S514.

At S503, the PC determines whether the destination has the black/white facsimile transmission type. When it is determined that the destination has the black/white facsimile transmission type ("YES" at S503), the operation proceeds to S504. When it is determined that the destination has the color facsimile transmission type ("NO" at S503), the operation proceeds to S509.

At S504, the PC refers to the address information table T3 of FIGS. 6E and 6F to obtain the name that corresponds to the destination specified by the user at S501. More specifically, in this example, the PC obtains the name that corresponds to the short-cut number, or the ID being assigned to the destination, selected by the user.

At S505, the PC determines that the data is to be transmitted in the form of monochrome image. The PC further generates header information HH using information regarding the current date/time obtainable from the timing circuit 25, the name of the selected destination obtained at S504, and the name of the PC or the user at the PC. The generated header information HH is put before the image data to be transmitted. In this example, when more than one page of image data is to be transmitted, the header information HH is generated for each page of image data and inserted before each page of image data. In such case, the header information HH may include information regarding the page number of each page.

At S506, the PC applies MMR compression to the image data.

At S507, the PC generates fax job information for the image data to be transmitted, which includes information regarding the destination that is specified by the user, and the image data to be transmitted.

At S508, the PC sends the fax request to the MFP FX through the LAN LN, which requests the MFP FX to send the image data to the specified destination according to the fax job information, and the operation ends. For example, the CPU 21 may cause the LAN controller 27 to transmit the fax request through the LAN I/F 26.

When it is determined that the destination has the color facsimile transmission type ("NO" at S503), the operation proceeds to S509 to obtain the name that corresponds to the destination specified by the user at S501 using the address information table T3 of FIGS. 6E and 6F in a substantially similar manner as described above referring to S504 of FIG. 13.

At S510, the PC determines that the data is to be transmitted in the form of color image. The PC further generates header information HH using information regarding the current date/time obtainable from the timing circuit 25, the name of the destination obtained at S509, and the name of the PC or the user at the PC. The generated header information HH is put before the image data to be transmitted in a substantially similar manner as described above referring to S505.

At S511, the PC determines a compression ratio of the image data, for example, based on the network load or the available memory space of the MFP FX, in a substantially similar manner as described above referring to S110 of FIG. 7.

At S512, the PC applies JPEG compression to the image data using the compression ratio determined at S511. In this example, the JPEG compression is applied to the image data, one page by one page.

At S513, the PC generates fax job information for the image data to be transmitted, which includes information regarding the destination that is specified by the user, and the image data to be transmitted. When the fax job information is generated, the operation proceeds to S508 to send the fax request as described above, and the operation ends.

When it is determined that the number of destinations is greater than 1 ("NO" at S502), the operation proceeds to S514 to generate image data in the RGB format.

At S515, the PC generates fax job information for the image data to be transmitted, which includes information regarding the plurality of destinations that are specified by the user and information regarding the transmission type for each one of the plurality of destinations that are obtainable from the destination information table T1, and the image data to be transmitted in a substantially similar manner as described above referring to S313 of FIG. 11. The operation proceeds to S508 to send the fax request and the operation ends.

When the fax request that is generated by the PC as described above referring to FIG. 13 is received from the PC, the MFP FX may process the fax request in a substantially similar manner as described above referring to FIGS. 12A and 12B.

Using the address book function of the MPF FX, the user may easily specify a destination, without the need of inputting the facsimile number or the address.

In any one of the operations described above referring to FIGS. 7 to 13, it is assumed that the user can select one of the "black/white facsimile transmission" and the "color facsimile transmission". Alternatively, the user may select the other transmission types including, for example, the email transmission type and the FTP transmission type.

The email transmission type allows the user to send data in the form of a data file attached to an email. In such case, the user may input an email address of the destination in the entry box BXb. Alternatively, the user may select the check box BXa to cause the entry box BXb to automatically display a user name that corresponds to the destination email address.

The FTP transmission allows the user to send data to a specific folder, which is located in a storage device provided on the communication system CS of FIG. 1. The storage device may be provided within the MFP FX or outside the MFP FX as long as it is accessible by the MFP FX. In such case, the user may input a network address of the destination folder in the entry box BXb. Alternatively, the user may select the check box BXa to cause the entry box BXb to automatically display a folder name that corresponds to the destination network address.

Figure 14A:
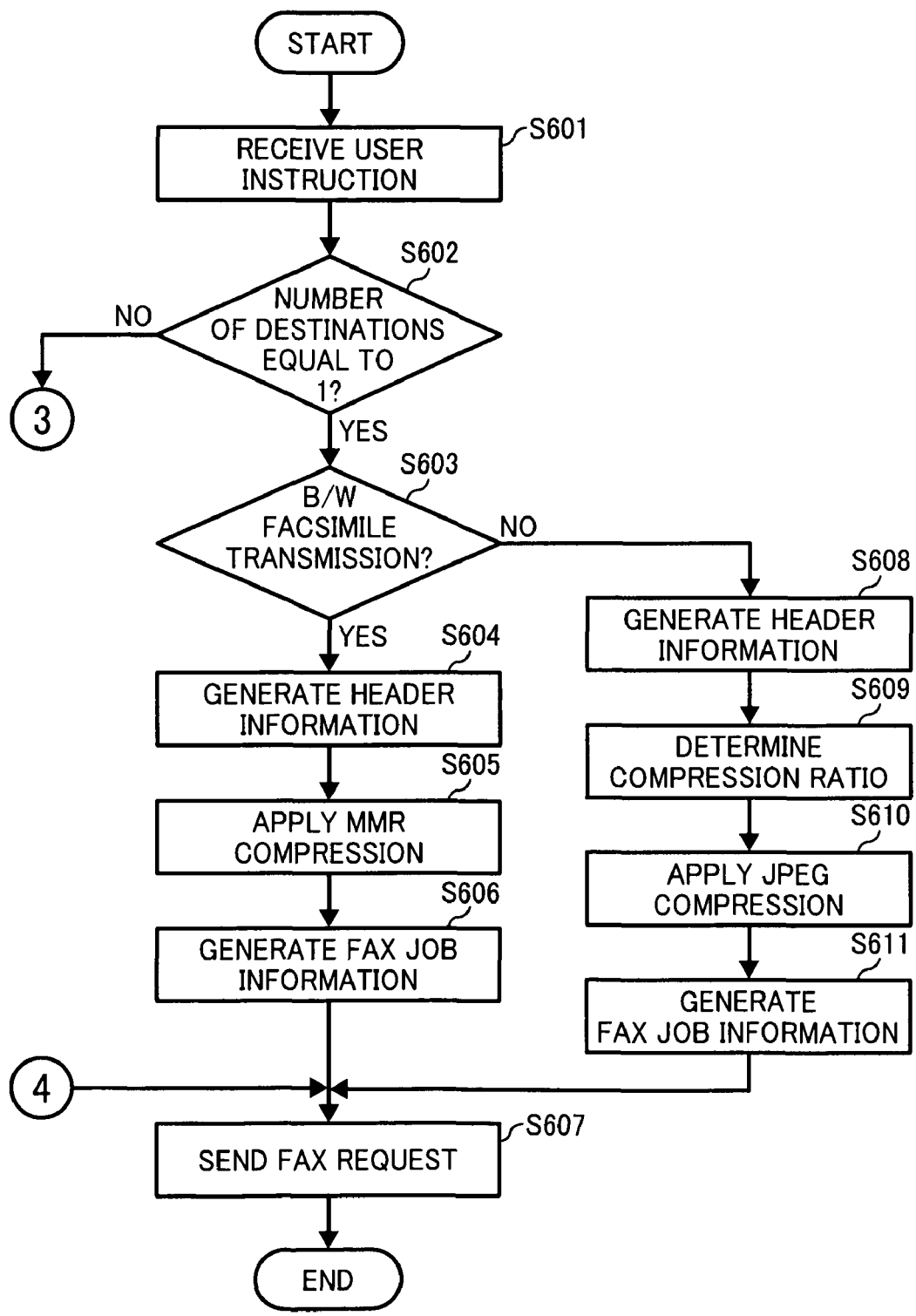
FIGS. 14A and 14B are flowchart illustrating operation of generating a fax job and sending a fax request to the multifunctional apparatus of FIG. 2, performed by the computer of FIG. 3, according to an example embodiment of the present invention.
Figure 14B:
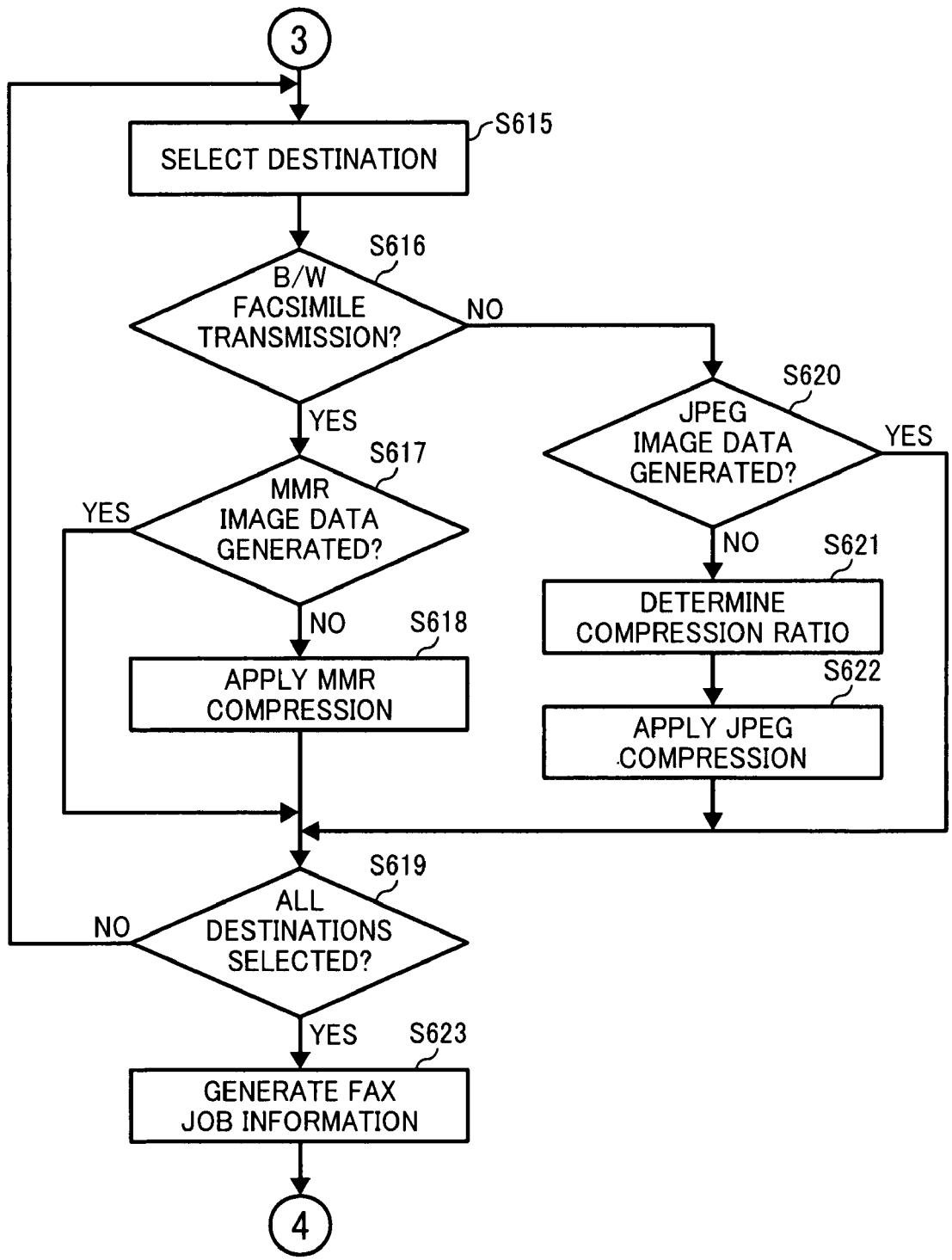

Referring to FIGS. 14A and 14B, operation of generating a fax job according to a user instruction and sending a fax request to the MFP FX, performed by the PC, is explained according to an example embodiment of the present invention.

Referring to FIG. 14A, at S601, the PC receives a user instruction, which requests the PC to send a fax request to the MFP FX, through the facsimile transmission screen of FIG. 4 as described above referring to FIG. 4. In this example, it is assumed that the user can select one of a plurality of transmission types including the black/white facsimile transmission type, color facsimile transmission type, email transmission type, and FTP transmission type.

At S602, the PC determines whether the number of destinations specified by the user is equal to 1. When it is determined that the number of destinations is 1 ("YES" at S602), the operation proceeds to S603. When it is determined that the number of destination is not 1 ("NO" at S602), the operation proceeds to S615 of FIG. 14B.

At S603, the PC determines whether the destination has the black/white facsimile transmission type. When it is determined that the destination has the black/white facsimile transmission type ("YES" at S603), the operation proceeds to S604. When it is determined that the destination does not have the black/white facsimile transmission type ("NO" at S603), the operation proceeds to S608. In this example, it is determined that the destination does not have the black/white facsimile transmission type, when one of the color facsimile transmission type, email transmission type, and FTP transmission type is selected.

S604, S605, and S606 are performed in a substantially similar manner as described above referring to S104, S105, and S106 of FIG. 7.

S608, S609, S610, and S611 are performed in a substantially similar manner as described above referring to S109, S110, S111, and S112 of FIG. 7.

At S607, the PC sends the fax request to the MFP FX through the LAN LN, which requests the MFP FX to send the image data to the specified destination according to the fax job information. For example, the CPU 21 may cause the LAN controller 27 to transmit the fax request through the LAN I/F 26.

When it is determined that the number of destinations is greater than 1 ("NO" at S602), the operation proceeds to S615 of FIG. 14B.

At S615, the PC selects one destination from the plurality of destinations specified by the user.

At S616, the PC determines whether the selected destination has black/white facsimile transmission type. When it is determined that the selected destination has the black/white facsimile transmission type ("YES" at S616), the operation proceeds to S617. When it is determined that the selected destination does not have the black/white facsimile transmission type ("NO" at S616), the operation proceeds to S620. In this example, it is determined that the destination does not have the black/white facsimile transmission type, when one of the color facsimile transmission type, email transmission type, and FTP transmission type is selected.

At S617, the PC determines whether the MMR image data has been generated using the data to be transmitted. When it is determined that the MMR image data is generated ("YES" at S617), the operation proceeds to S619. When it is determined that the MMR image data is not generated ("NO" at S617), the operation proceeds to S618.

At S618, the PC applies MMR compression to the image data, and stores the MMR image data in a memory. At this time, the PC may convert the image data from the color image to the monochrome image when the image data, which is obtained from the document data, is in color.

At S619, the PC determines whether all destinations have been selected. When it is determined that all destinations have been selected ("YES" at S619), the operation proceeds to S623. When it is determined that all destination have not been selected ("NO" at S619), the operation returns to S615 to select another destination and perform the above-described operation to prepare the image data to be transmitted as needed.

At S620, the PC determines whether the JPEG image data has been generated using the data to be transmitted. When it is determined that the JPEG image data is generated ("YES" at S620), the operation proceeds to S621. When it is determined that the JPEG image data is not generated ("NO" at S620), the operation proceeds to S619.

At S621, the PC determines a compression ratio, for example, based on the network load or the available memory space of the MFP FX in a substantially similar manner as described above referring to FIG. 8 or 9. Alternatively, the compression ratio may be set to a value that is relatively small, such as 20%. The low compression ratio may suppress the degradation in image quality due to compression or decompression.

At S622, the PC applies JPEG compression to the image data at the compression ratio determined at S621, and stores the JPEG image data in a memory.

At S623, the PC generates fax job information for the image data to be transmitted, which includes information regarding the plurality of destinations that are specified by the user and information regarding the transmission type for each one of the plurality of destinations that are obtainable from the destination information table T1, and the image data to be transmitted. For example, referring back to FIGS. 6A to 6C, information regarding the plurality of destinations may be provided in the form of destination information table T1 including information regarding the transmission type for each destination. Further, in this example, the MMR image data or the JPEG image data is included as the image data to be used for the plurality of destinations, depending on the transmission type specified by the user for each destination.

At S607, the PC sends the fax request to the MFP FX through the LAN LN, which requests the MFP FX to send the image data to the specified destination according to the fax job information.

As described above referring to FIGS. 14A and 14B, the PC may send the image data in more than one format depending on the transmission type specified by the user for each destination, when there is more than one destination.

Further, as the color image data is sent in JPEG compression format, the network load of the MFP FX may be reduced when compared to the case where the color image data is sent in RGB uncompressed format.

When generating the JPEG image data, as described above referring o S621, the compression ratio may be set to be a low value, for example, to 20%. This suppresses the degradation in image quality caused due to repeated process of compression and decompression. For example, when the image data is sent in compressed format, the MFP FX needs to uncompress the compressed image data before adding header information HH. In such case, after adding the header information HH, the MFP FX again applies JPEG compression to compress the decompressed image data. Even in such case, the degradation in image quality may be suppressed when the compression ratio is set relatively low.

Further, the PC may be programmed such that it is capable of determining a desired format to be used when the image data is sent in the form of color image, according to various conditions regarding data transmission including image processing to be applied before sending the image data, and the status of the communication system CS.

In one example, the PC may determine to generate and send image data in the JPEG compressed format as described above referring FIGS. 14A and 14B when image data to be transmitted has a large data size, for example, due to a large number of pages, rather than generating and sending image data in the RGB format as described above referring to FIG. 11.

In another example, the PC may determine to generate and send image data in the JPEG compressed format as described above referring FIGS. 14A and 14B when image data to be transmitted does not have to be added with header information HH since further processing is not necessary. In such case, the image quality of the image data is kept relatively high. Further, the network load of the communication system CS such as the network traffic of the LAN LN may be suppressed.

In another example, the PC may determine to generate and send image data in the uncompressed RGB format as described above referring FIG. 11 when image data to be transmitted is to be added with header information HH since further processing by the MFP FX is necessary.

Figure 15A:
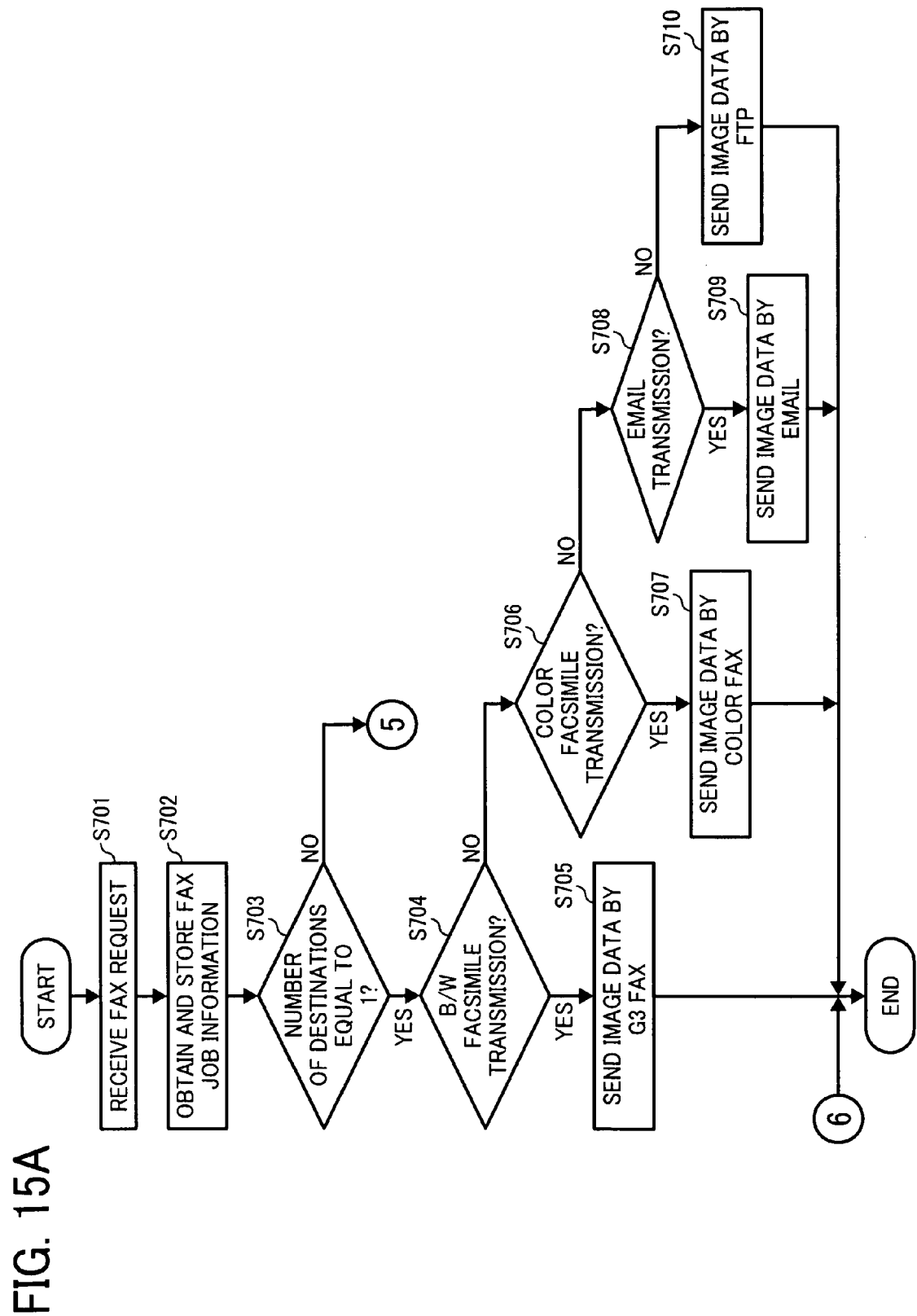
FIGS. 15A and 15B are flowchart illustrating operation of processing a fax job according to a fax request received from the computer of FIG. 3, performed by the multifunctional apparatus of FIG. 2, according to an example embodiment of the present invention.
Figure 15B:
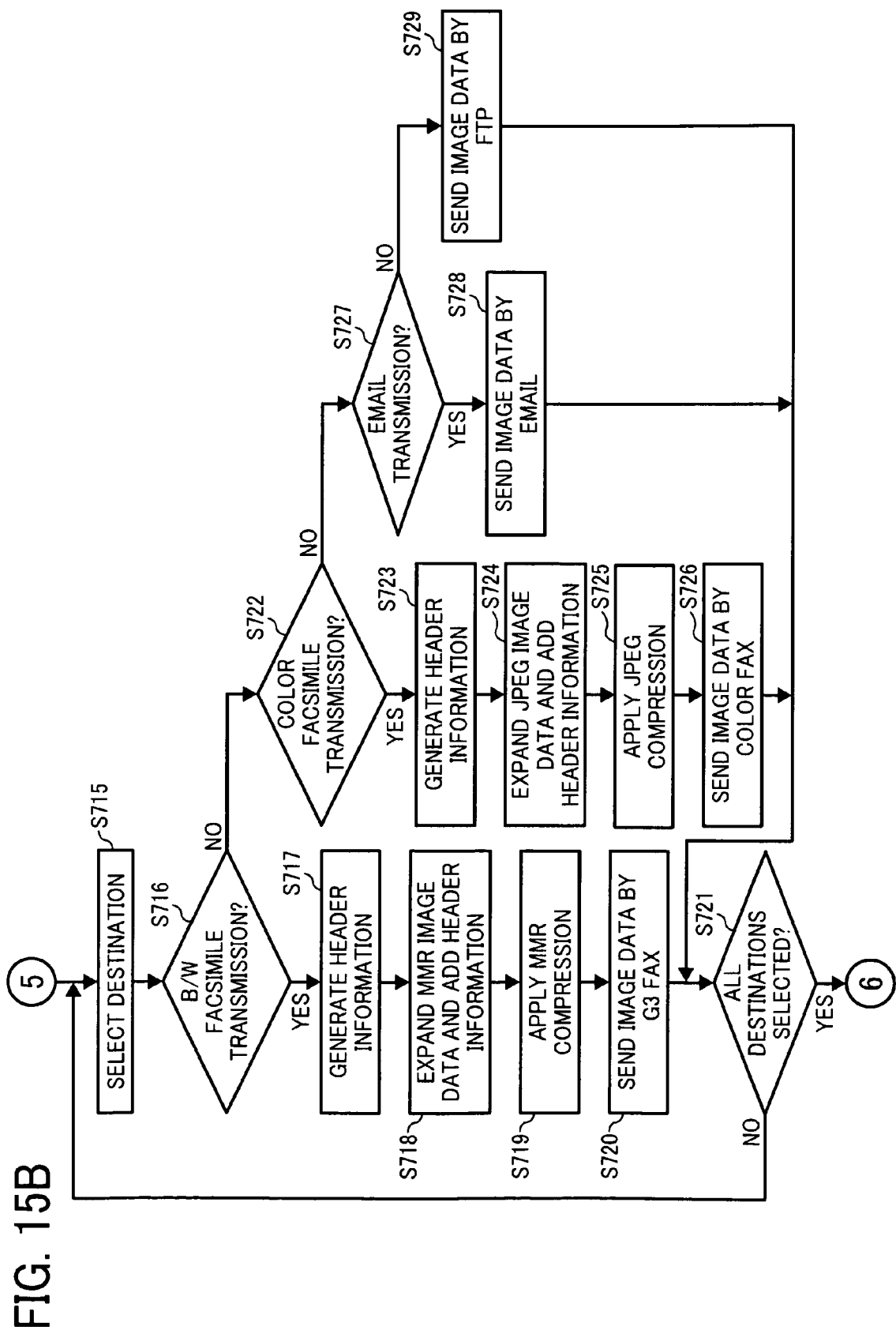

Referring to FIGS. 15A and 15B, operation of processing a fax job according to the fax request received from the PC, performed by the MFP FX, is explained according to an example embodiment of the present invention.

Referring to FIG. 15A, at S701, the MFP FX receives the fax request from the PC, which requests the MFP FX to perform the fax job according to the fax job information sent together with the fax request.

At S702, the MFP FX stores the fax job information in a memory.

At S703, the MFP FX determines whether the number of destinations specified by the fax job information is equal to 1. When it is determined that the number of destinations is 1 ("YES" at S703), the operation proceeds to S704. When it is determined that the number of destinations is greater than 1 ("NO" at S703), the operation proceeds to S715 of FIG. 15B.

At S704, the MFP FX determines whether the transmission type is the black/white facsimile transmission type in a substantially similar manner as described above referring to S203 of FIG. 10. When it is determined that the transmission type is the black/white facsimile transmission type ("YES" at S704), the operation proceeds to S705. When it is determined that the transmission type is not the black/white facsimile transmission type ("NO" at S704), the operation proceeds to S706.

At S705, the MPF FX causes the communication line controller 11 to send the image data to the specified destination through the PSTN using the G3 fax modem 10, in a substantially similar manner as described above referring to S204 of FIG. 10. The image data to be transmitted, which is received from the PC in the form of MMR monochrome image, is obtainable from the fax job information.

At S706, the MFP FX determines whether the transmission type is the color facsimile transmission type. When it is determined that the transmission type is the color facsimile transmission type ("YES" at S706), the operation proceeds to S707. When it is determined that the transmission type is not the color facsimile transmission type ("YES" at S706), the operation proceeds to S707.

At S707, the MFP FX causes the LAN controller 13 to send the image data to the specified destination through the LAN, in a substantially similar manner as described above referring to S205 of FIG. 10. The image data to be transmitted, which is received from the PC in the form of JPEG color image, is obtainable from the fax job information.

At S708, the MFP FX determines whether the transmission type is the email transmission type. When it is determined that the transmission type indicates the email transmission type ("YES" at S708), the operation proceeds to S709. When it is determined that the transmission type does not indicate the email transmission type ("NO" at S708), the operation proceeds to S710.

At S709, the MFP FX generates email data to which the image data is attached as an attached file, and causes the LAN controller 13 to send the email data to an email server provided on the communication system CS of FIG. 1 through the LAN. In order to add the image data in the form of attached file, the image data is converted from a binary format to an MIME format. Further, the image data to be transmitted, which is received from the PC in the form of JPEG color image, is obtainable from the fax job information.

At S710, the MEP FX determines that the transmission type indicates the FTP transmission type, and causes the LAN controller 13 to send the image data to the destination folder through the LAN based on the FTP when the destination folder is provided outside the MFP FX. Alternatively, when the destination folder is provided inside the MFP FX, the MFP FX stores the image data in the destination folder.

When it is determined that the number of destinations is greater than 1 at S703 ("NO" at S703), the operation proceeds to S715 of FIG. 15B to perform operation illustrated in FIG. 15B.

At S715, the MFP FX selects one destination from the plurality of destinations specified by the user, which is obtainable from the fax job information.

At S716, the MFP FX determines whether the selected destination has the black/white facsimile transmission type. When it is determined that the selected destination has the black/white facsimile transmission type ("YES" at S716), the operation proceeds to S717. When it is determined that the selected destination does not have the black/white facsimile transmission type ("NO" at S716), the operation proceeds to S722.

At S717, the MFP FX generates header information HH using information regarding the current date/time obtainable from the timing circuit 4, the name of the selected destination obtainable from the fax job information, and the name of the PC or the user at the PC. The generated header information HH is put before the image data to be transmitted.

At S718, the MFP FX expands the MMR image data into monochrome image data, and adds the header information HH to the monochrome image data. The MMR image data may be obtained from the fax job information being received from the PC.

At S719, the MFP FX applies MMR compression to the image data to which the header information HH is added.

S717, S718 and S719 may be performed for each page of image data, when the image data includes more than one page.

At S720, the MFP FX causes the communication line controller 11 to send the image data generated at S719 to the selected destination selected at S715 through the PSTN using the G3 fax modem 10, in a substantially similar manner as described above referring to S204 of FIG. 10.

At S721, the MFP FX determines whether all destinations have been selected. When it is determined that all destinations have been selected ("YES" at S721), the operation ends. When it is determined that all destination have not been selected ("NO" at S721), the operation returns to S715 to select another destination.

When it is determined that the transmission type for the selected destination does not indicate the black/white facsimile transmission type ("NO" at S716), the operation proceeds to S722 to determine whether the transmission type for the selected destination indicates the color facsimile transmission type. When it is determined that the transmission type for the selected destination indicates the color facsimile transmission type ("YES" at S722), the operation proceeds to S723. When it is determined that the transmission type for the selected destination does not indicate the color facsimile transmission ("NO" at S722), the operation proceeds to S727.

At S723, the MFP FX generates header information HH using information regarding the current date/time obtainable from the timing circuit 4, the name of the selected destination obtainable from the fax job information, and the name of the PC or the user at the PC. The generated header information HH is put before the image data to be transmitted.

At S724, the MFP FX expands the JPEG image data to color image data, and adds the header information HH to the color image data. The JPEG image data is obtainable from the fax job information, which is received from the PC.

At S725, the MFP FX applies JPEG compression to the color image data to which the header information HH is added. At S725, the compression ratio may be determined based on the network load or the available memory space of a destination apparatus in a substantially similar manner as described above referring to FIG. 8 or 9. Alternatively, the compression ratio may be previously set according to the default settings. Further, S723, S724 and S725 may be performed for each page of image data, when the image data includes more than one page.

At S726, the MFP FX causes the LAN controller 13 to send the image data to the selected destination through the LAN, in a substantially similar manner as described above referring to S205 of FIG. 10.

When it is determined that the transmission type for the selected destination does not indicate the color facsimile transmission type ("NO" at S722), the operation proceeds to S727 to determine whether the transmission type for the selected destination indicates the email transmission type. When it is determined that the transmission type for the selected destination indicates the email transmission type ("YES" at S727), the operation proceeds to S728. When it is determined that the transmission type for the selected destination does not indicate the email transmission type ("NO" at S727), the operation proceeds to S729.

At S728, the MFP FX sends the image data via email in a substantially similar manner as described above referring to S709 of FIG. 15A.

At S729, the MFP FX determines that the transmission type corresponds to the folder transmission type, and sends the image data via FTP in a substantially similar manner as described above referring to S710 of FIG. 15A.

As described above referring to FIGS. 14A, 14B, 15A and 15B, the communication system CS is capable of determining whether the image data is to be transmitted in the form of monochrome image data or color image data according to the transmission type input by the user. For example, when the transmission type corresponds to the black/white facsimile transmission type, the communication system CS determines that the image data is to be sent in monochrome image. When the transmission data type corresponds to any one of the color facsimile transmission type, email transmission type, and FTP transmission type, the communication system CS determines that the image data is to be sent in color image.

When there is more than one destination that has been selected, the image data is sent in more than one format depending on the transmission type that is set for each destination. For example, when the transmission type for a first destination corresponds to the black/white facsimile transmission type and the transmission type for a second destination corresponds to the color facsimile transmission type, the PC sends the monochrome image data such as MMR image data to be sent to the first destination and the color image data such as JPEG image data to be sent to the second destination.

Figure 16:
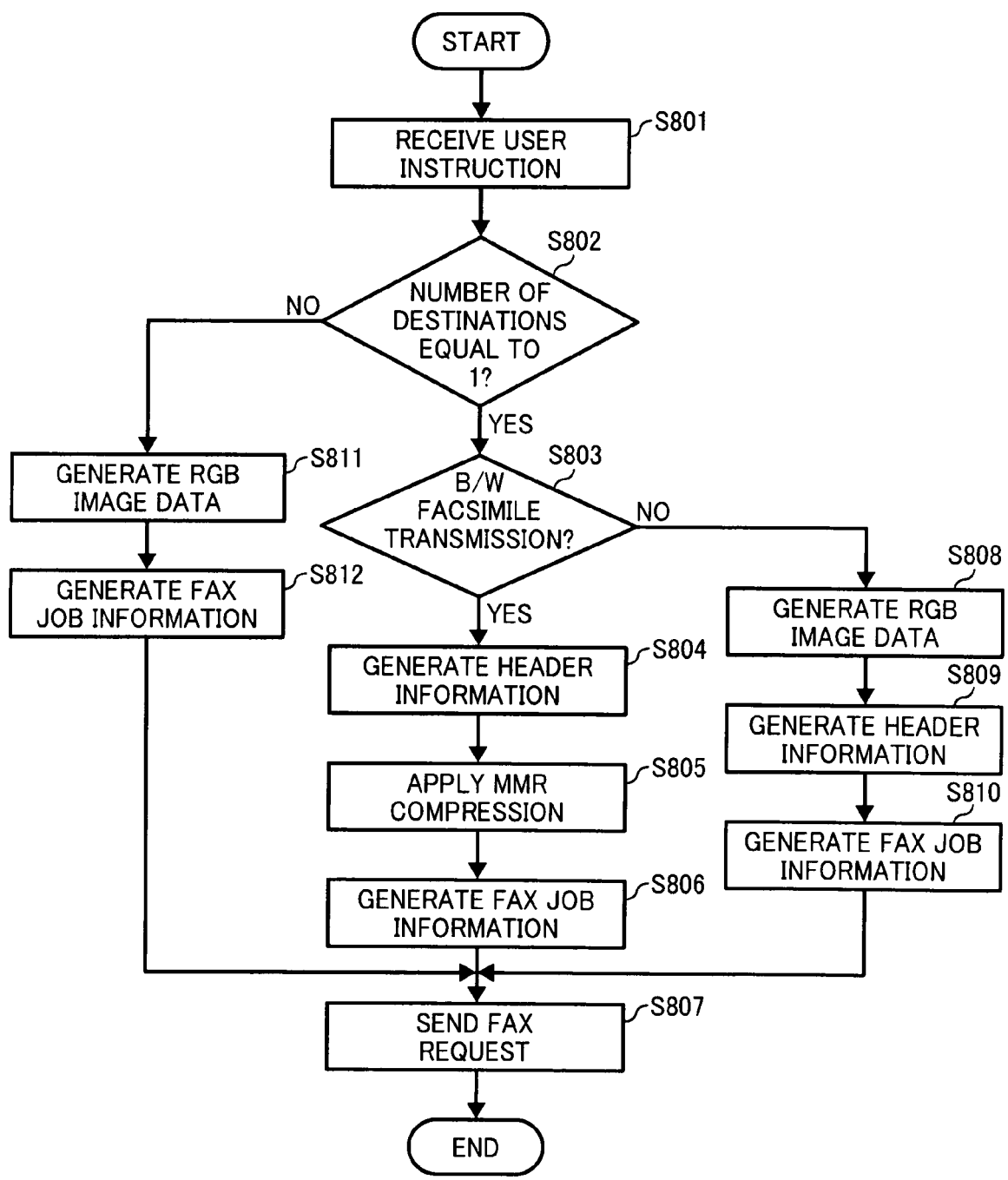
FIG. 16 is a flowchart operation of generating a fax job and sending a fax request to the multifunctional apparatus of FIG. 2, performed by the computer of FIG. 3, according to an example embodiment of the present invention.

Referring to FIG. 16, operation of generating a fax job according to a user instruction and sending a fax request to the MFP FX, performed by the PC, is explained according to an example embodiment of the present invention.

At S801, the PC receives a user instruction, which requests the PC to send a fax request to the MFP FX, through the facsimile transmission screen of FIG. 4 as described above referring to FIG. 4. In this example, it is assumed that the user can select one of a plurality of transmission types including the black/white facsimile transmission type, color facsimile transmission type, email transmission type, and FTP transmission type.

AT S802, the PC determines whether the number of destinations specified by the user is equal to 1. When it is determined that the number of destinations is 1 ("YES" at S802), the operation proceeds to S803. When it is determined that the number of destination is not 1 ("NO" at S802), the operation proceeds to S811.

At S803, the PC determines whether the destination has the black/white facsimile transmission type. When it is determined that the destination has the black/white facsimile transmission type ("YES" at S803), the operation proceeds to S804. When it is determined that the destination does not have the color facsimile transmission type ("NO" at S303), the operation proceeds to S808. In this example, it is determined that the destination does not have the black/white facsimile transmission type, when one of the color facsimile transmission type, email transmission type, and FTP transmission type is selected.

S804, S805, and S806 are performed in a substantially similar manner as described above referring to S104, S105, and S106 of FIG. 7.

When it is determined that the destination does not have the black/white facsimile transmission type ("NO" at S803), the operation proceeds to S808 to determine that the image data is to be transmitted in the form of color image data. At S808, the PC generates RGB image data.

At S809, the PC generates header information HH using information regarding the current date/time obtainable from the timing circuit 25, the name of the selected destination obtainable from the fax job information such as the destination information table T1 of FIGS. 6A to 6C, and the name of the PC or the user at the PC. The generated header information HH is put before the image data to be transmitted in a substantially similar manner as described above referring to S104.

At S810, the PC generates fax job information for the image data to be transmitted, which includes information regarding the destination that is specified by the user obtainable from the destination information table T1, and the image data to be transmitted.

At S807, the PC sends the fax request to the MFP FX through the LAN LN, which requests the MFP FX to send the image data to the specified destination according to the fax job information. For example, the CPU 21 may cause the LAN controller 27 to transmit the fax request through the LAN I/F 26.

When it is determined that the number of destinations is greater than 1 ("NO" at S802), the operation proceeds to S811 to generate image data in the RGB format.

At S811, the PC generates fax job information for the image data to be transmitted, which includes information regarding the plurality of destinations that are specified by the user and information regarding the transmission type for each one of the plurality of destinations that are obtainable from the destination information table T1, and the image data to be transmitted in a substantially similar manner as described above referring to S313 of FIG. 11. The operation proceeds to S807 to send the fax request and the operation ends.

Figure 17A:
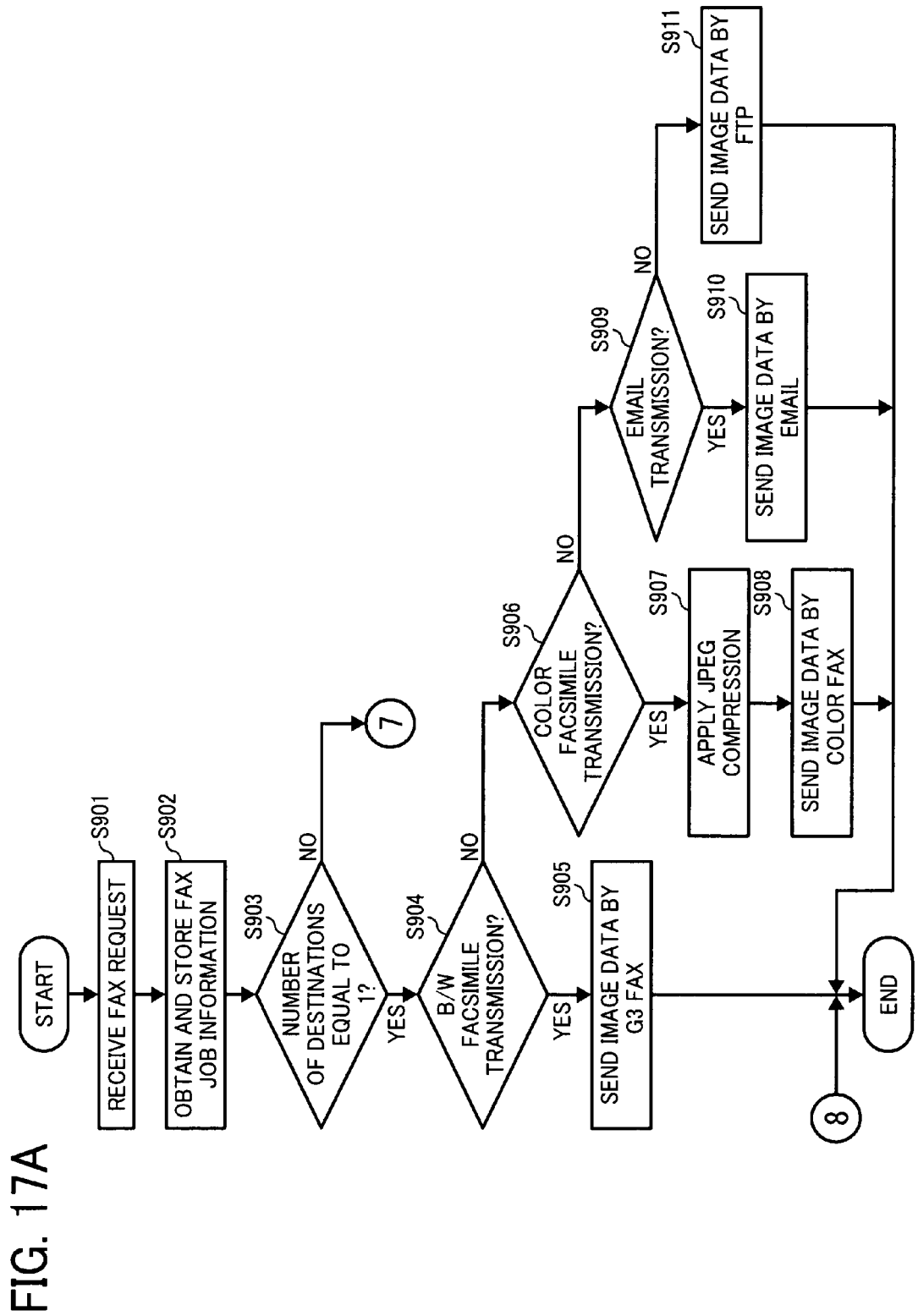

Referring to FIGS. 17A and 17B, operation of processing a fax job according to the fax request received from the PC, performed by the MFP FX is explained according to an example embodiment of the present invention.

Referring to FIG. 17A, at S910, the MFP FX receives the fax request from the PC, which requests the MFP FX to perform the fax job according to the fax job information sent together with the fax request.

At S902, the MFP FX stores the fax job information in a memory.

At S903, the MFP FX determines whether the number of destinations specified by the fax job information is equal to 1. When it is determined that the number of destinations is 1 ("YES" at S903), the operation proceeds to S904. When it is determined that the number of destinations is greater than 1 ("NO" at S903), the operation proceeds to S915 of FIG. 17B.

At S904, the MFP FX determines whether the transmission type is the black/white facsimile transmission type in a substantially similar manner as described above referring to S203 of FIG. 10. When it is determined that the transmission type indicates the black/white facsimile transmission type ("YES" at S904), the operation proceeds to S905. When it is determined that the transmission type does not indicate the black/white facsimile transmission type ("NO" at S904), the operation proceeds to S906.

At S905, the MPF FX causes the communication line controller 11 to send the image data to the specified destination through the PSTN using the G3 fax modem 10, in a substantially similar manner as described above referring to S204 of FIG. 10, and the operation ends. The image data to be transmitted, which is received from the PC in the form of MMR monochrome image, is obtainable from the fax job information.

At S906, the MFP FX determines whether the transmission type indicates the color facsimile transmission type. When it is determined that the transmission type indicates the color facsimile transmission type ("YES" at S906), the operation proceeds to S907. When it is determined that the transmission type does not indicate the color facsimile transmission type ("YES" at S906), the operation proceeds to S909.

At S907, the MFP FX applies JPEG compression to the image data received from the PC, and stores the JPEG image data in a memory. The image data be transmitted, which is received from the PC in the form of RGB color image, is obtainable from the fax job information.

At S908, the MFP FX causes the LAN controller 13 to send the image data generated at S907 to the specified destination through the LAN, in a substantially similar manner as described above referring to S205 of FIG. 10.

At S909, the MFP FX determines whether the transmission type indicates the email transmission type. When it is determined that the transmission type indicates the email transmission type ("YES" at S909), the operation proceeds to S910. When it is determined that the transmission type does not indicate the email transmission type ("NO" at S909), the operation proceeds to S911.

At S910, the MFP FX generates email data to which the image data is attached as an attached file, and causes the LAN controller 13 to send the email data to an email server provided on the communication system CS of FIG. 1 through the LAN, in a substantially similar manner as described above referring to S709 of FIG. 15A, and the operation ends.

At S911, the MEP FX determines that the transmission type indicates the FTP transmission, and causes the LAN controller 13 to send the image data to the destination folder through the LAN based on the FTP in a substantially similar manner as described above referring to S710 of FIG. 15A, and the operation ends.

When it is determined that the number of destinations is greater than 1 at S903 ("NO" at S903), the operation proceeds to S915 of FIG. 16B to perform operation illustrated in FIG. 16B.

At S915, the MFP FX selects one destination from the plurality of destinations specified by the user, which is obtainable from the fax job information.

At S916, the MFP FX determines whether the selected destination has the black/white facsimile transmission type. When it is determined that the selected destination has the black/white facsimile transmission type ("YES" at S916), the operation proceeds to S917. When it is determined that the selected destination does not have the black/white facsimile transmission type ("NO" at S916), the operation proceeds to S922.

At S917, the MFP FX generates header information HH using information regarding the current date/time obtainable from the timing circuit 4, the name of the selected destination obtainable from the fax job information, and the name of the PC or the user at the PC. The generated header information HH is put before the image data to be transmitted, which is received from the PC in the RGB format.

At S918, the MFP FX converts the RGB image data to which the header information HH is added, to monochrome image data.

At S919, the MFP FX applies MMR compression to the monochrome image data.

S917, S918 and S919 may be performed for each page of image data, when the image data includes more than one page.

At S920, the MFP FX causes the communication line controller 11 to send the image data generated at S919 to the selected destination selected at S915 through the PSTN using the G3 fax modem 10, in a substantially similar manner as described above referring to S204 of FIG. 10.

At S921, the MFP FX determines whether all destinations have been selected. When it is determined that all destinations have been selected ("YES" at S921), the operation ends. When it is determined that all destination have not been selected ("NO" at S921), the operation returns to S915 to select another destination.

When it is determined that the transmission type for the selected destination does not indicate the black/white facsimile transmission ("NO" at S916), the operation proceeds to S922 to determine whether the transmission type for the selected destination indicates the color facsimile transmission type. When it is determined that the transmission type for the selected destination indicates the color facsimile transmission type ("YES" at S922), the operation proceeds to S923. When it is determined that the transmission type for the selected destination does not indicate the color facsimile transmission type ("NO" at S922), the operation proceeds to S926.

At S923, the MFP FX generates header information HH using information regarding the current date/time obtainable from the timing circuit 4, the name of the selected destination obtainable from the fax job information, and the name of the PC or the user at the PC. The generated header information HH is put before the image data to be transmitted, which is received from the PC in the RGB format.

At S924, the MFP FX applies JPEG compression to the image data to which the header information HH is added. At S924, the compression ratio may be determined based on the network load or the available memory space of a destination apparatus, for example, in a substantially similar manner as described above referring to FIG. 8 or 9. Alternatively, the compression ratio may be previously set according to the default settings. Further, S923 and S924 may be performed for each page of image data, when the image data includes more than one page.

At S925, the MFP FX causes the LAN controller 13 to send the image data generated at S924 to the selected destination through the LAN, in a substantially similar manner as described above referring to S205 of FIG. 10.

When it is determined that the transmission type for the selected destination does not indicate the color facsimile transmission type ("NO" at S922), the operation proceeds to S926 to determine whether the transmission type for the selected destination indicates the email transmission type.

When it is determined that the transmission type for the selected destination indicates the email transmission type ("YES" at S926), the operation proceeds to S927. When it is determined that the transmission type for the selected destination does not indicate the email transmission type ("NO" at S926), the operation proceeds to S928.

At S927, the MFP FX sends the image data via email in a substantially similar manner as described above referring to S709 of FIG. 15A.

At S928, the MFP FX determines that the transmission type corresponds to the FTP transmission type, and sends the image data via FTP in a substantially similar manner as described above referring to S710 of FIG. 15A.

As described above referring to FIGS. 16, 17A and 17B, when there is only one destination specified by the user, the PC determines a desired format of image data according to the transmission type specified by the user, generates the image data having the determined format, and sends the image data to the MFP FX in the determined format. Since the image data is sent in the desired format, image processing to be performed by the MFP FX before sending the image data to a specific destination is simplified, while suppressing the degradation in image quality of the image data.

When there is more than one destination specified by the user, the PC sends the image data in the form of color image data such as RGB image data. In such case, the MFP FX may generate header information HH, and adds the header information to the image data received from the PC. Since only one type of image data is needed to be transmitted even when there is more than one destination, the overall network load of the computer system CS decreases.

When transmitting data from one destination to another destination, a cover sheet may be additionally sent such that the image data is transmitted after the cover sheet is transmitted. For example, as illustrated in FIG. 18, the image data to be transmitted may include cover sheet data, which may be inserted before the image data #1 corresponding to the first page of the image data to be transmitted. In this example, the user may instruct the PC to generate a cover sheet and attach the cover sheet to the image data to be transmitted, for example, through the fax transmission screen of FIG. 4. Referring back to FIG. 4, the fax transmission screen of FIG. 4 may be additionally provided with a button, which allows the user to select whether to insert the cover sheet.

Figure 19:
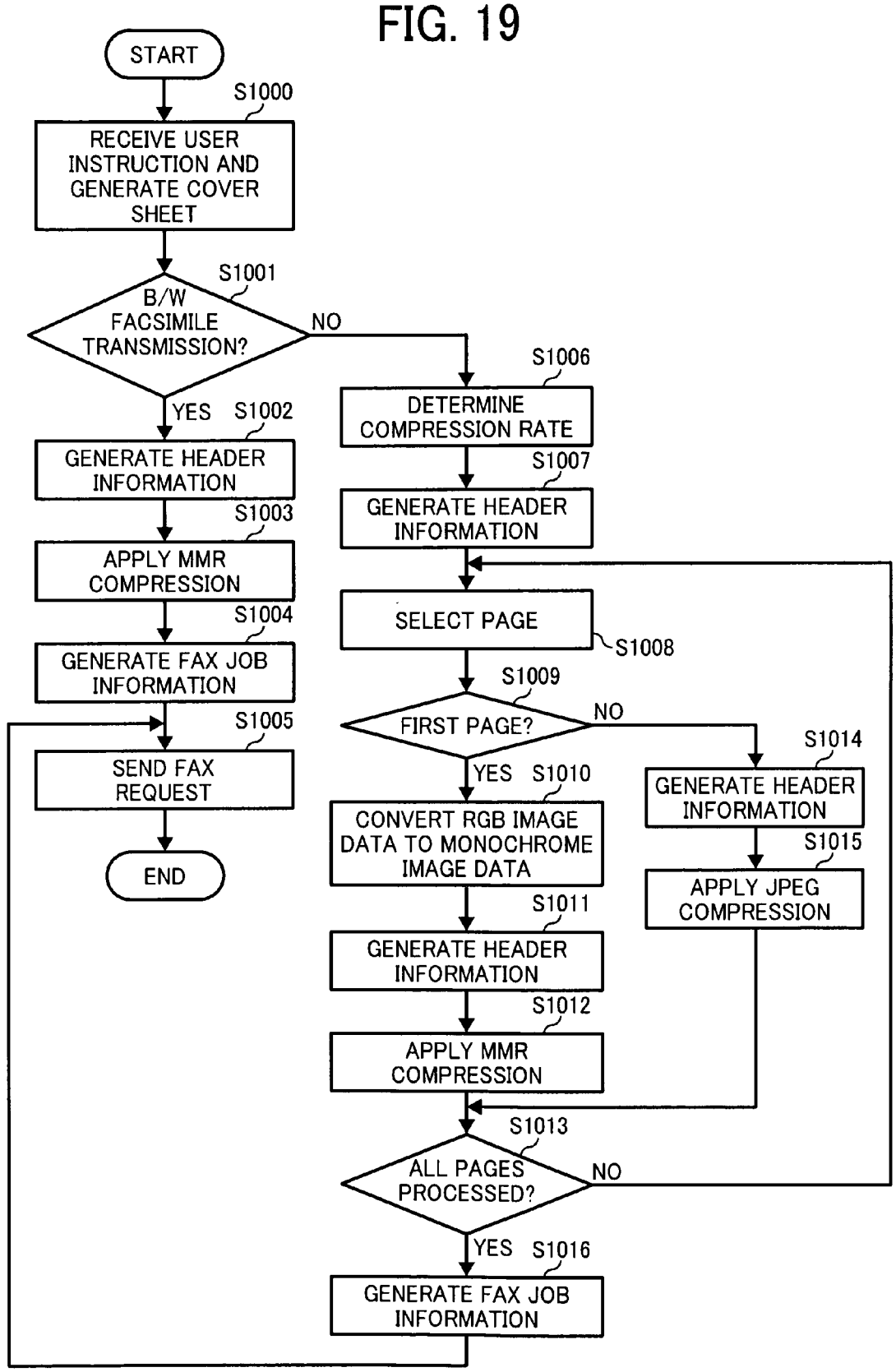
FIG. 19 is a flowchart illustrating operation of generating a fax job and sending a fax request to the multifunctional apparatus of FIG. 2, performed by the computer of FIG. 3, according to an example embodiment of the present invention.

Referring to FIG. 19, operation of generating a fax job according to a user instruction and sending a fax request to the MFP FX, performed by the PC, is explained according to an example embodiment of the present invention.

At S1000, the PC receives a user instruction, which requests the PC to send a fax request to the MFP FX, through the facsimile transmission screen of FIG. 4 as described above referring to FIG. 4. In this example, it is assumed that only one destination is specified by the user. Further, it is assumed that the user has selected to insert the cover sheet through the facsimile transmission screen of FIG. 4. According to the user instruction, the PC generates cover sheet data to be inserted in front of the image data to be transmitted.

At S1001, the PC determines whether the destination has the black/white facsimile transmission type. When it is determined that the destination has the black/white facsimile transmission type ("YES" at S1001), the operation proceeds to S1002. When it is determined that the destination has the color facsimile transmission type ("NO" at S1001), the operation proceeds to S1006.

At S1002, the PC determines that the data is to be transmitted in the form of monochrome image. The PC further generates header information HH using information regarding the current date/time obtainable from the timing circuit 25, the name of the selected destination obtainable from the fax job information of FIGS. 6A to 6C, and the name of the PC or the user at the PC. The generated header information HH is put before the image data to be transmitted, in a substantially similar manner as described above referring to S104 of FIG. 7.

At S1003, the PC applies MMR compression to the image data.

At S1004, the PC generates fax job information for the image data to be transmitted, which includes information regarding the destination that is specified by the user obtainable from the destination information table T1, and the image data to be transmitted.

At S1005, the PC sends the fax request to the MFP FX through the LAN LN, which requests the MFP FX to send the image data to the specified destination according to the fax job information. For example, the CPU 21 may cause the LAN controller 27 to transmit the fax request through the LAN I/F 26.

When it is determined that the destination has the color facsimile transmission type ("NO" at S1001), the operation proceeds to S1006 to determine that the data is to be transmitted in the form of color image. The PC determines a compression ratio of the image data, for example, based on the network load or the available memory space of the MFP FX in a substantially similar manner as described above referring to S110 of FIG. 7.

At S1007, the PC generates header information HH using information regarding the current date/time obtainable from the timing circuit 25, the name of the selected destination obtainable from the fax job information of FIGS. 6A to 6C, and the name of the PC or the user at the PC in a substantially similar manner as described above referring to S109 of FIG. 7.

At S1008, the PC selects image data corresponding to one page as a selected page. In this example, the PC selects image data corresponding to one page of the image data in the order starting from the first page to the last page. Further, in this example, it is assumed that the cover sheet data corresponds to the first page of the image data.

At S1009, the PC determines whether the selected page is the first page of the image data to be transmitted. When it is determined that the selected page is the first page ("YES" at S1009), the operation proceeds to S1010. When it is determined that the selected page is not the first page ("NO" at S1009), the operation proceeds to S1014.

At S1010, the PC converts the image data corresponding to the first page, i.e., the cover sheet, from color image data to monochrome image data. The image data, which is received from the PC in the RGB format, is obtainable from the fax job information.

At S1011, the PC adds the header information HH that is generated at S1007 to the monochrome image data that is generated at S1010 by inserting the header information HH before the image data.

At S1012, the PC applies MMR conversion to the monochrome image data to which the header information HH is added.

At S1013, the PC determines whether all pages have been processed. When it is determined that all pages have been processed ("YES" at S1013), the operation proceeds to S1016. When it is determined that all pages have not been processed ("NO" at S1013), the operation returns to S1008 to select another page, which follows the selected page that has been processed.

When it is determined that the selected page is not the first page ("NO" at S1009), the operation proceeds to S1014 to add the header information HH that is generated at S1007 to the color image data that corresponds to the selected image.

At S1014, the PC applies JPEG compression to the image data to which the header information HH is added, using a compression ratio previously determined, and the operation proceeds to S1013.

At S1016, the PC generates fax job information for the image data to be transmitted, which includes information regarding the destination that is specified by the user and the image data to be transmitted, and the operation proceeds to S1005 to send the fax request to the MFP FX through the LAN LN. The image data to be transmitted includes the MMR image data that corresponds to the first page, or the cover sheet, of the image data, and the JPEG image data that corresponds to the other pages of the image data.

Figure 20:
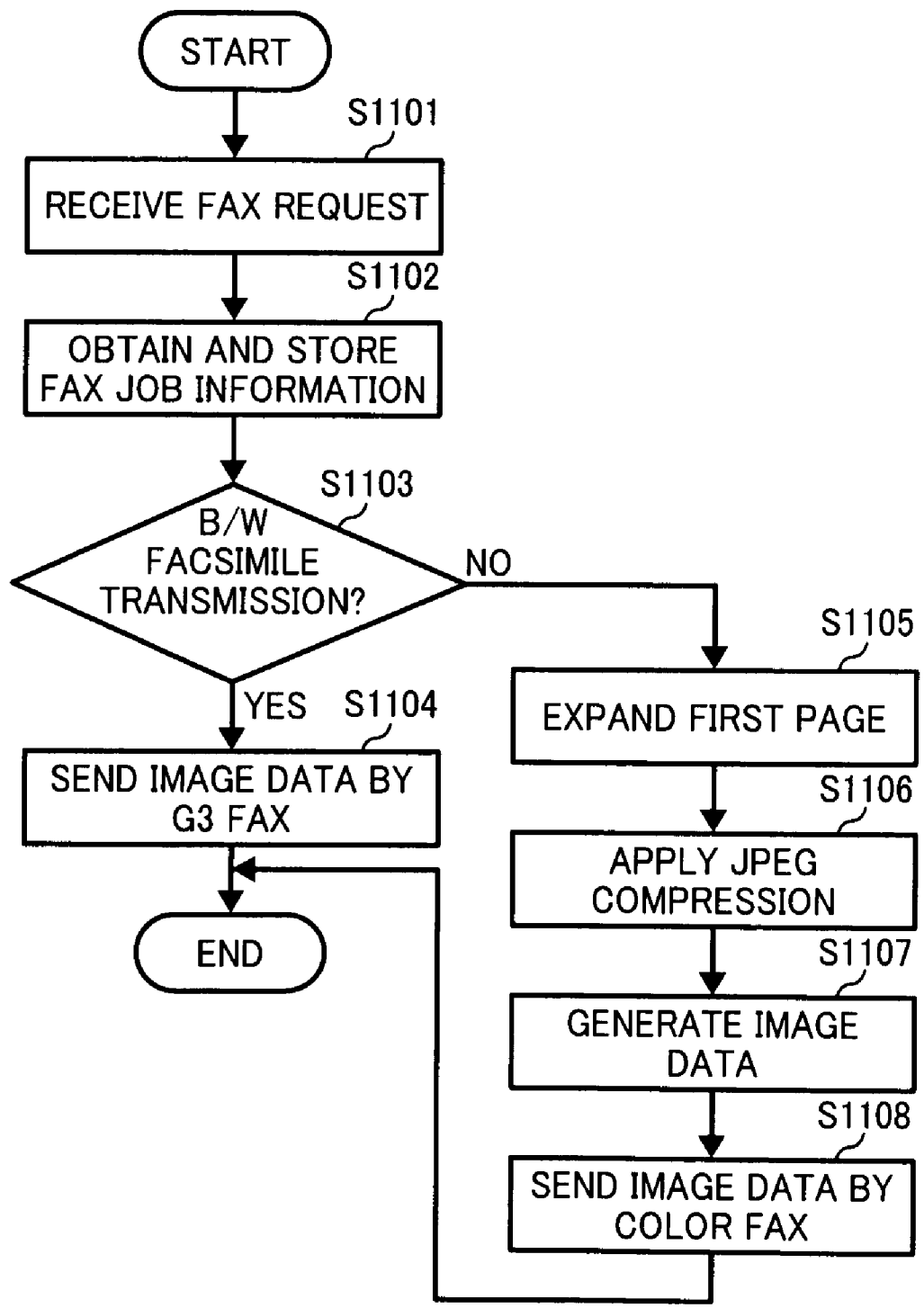
FIG. 20 is a flowchart illustrating operation of processing a fax job according to a fax request received from the computer of FIG. 3, performed by the multifunctional apparatus of FIG. 2, according to an example embodiment of the present invention.

Referring to FIG. 20, operation of processing a fax job according to the fax request received from the PC, performed by the MFP FX is explained according to an example embodiment of the present invention.

At S110, the MFP FX receives the fax request from the PC, which requests the MFP FX to perform the fax job according to the fax job information sent together with the fax request.

At S1102, the MFP FX stores the fax job information in a memory.

At S1103, the MFP FX determines whether the transmission type is the black/white facsimile transmission type. When it is determined that the transmission type is the black/white facsimile transmission type ("YES" at S1103), the operation proceeds to S1104. When it is determined that the transmission type is not the black/white facsimile transmission type ("NO" at S103), the operation proceeds to S1105.

At S1104, the MFP FX causes the communication line controller 11 to call the destination specified by the fax job information, for example, using the facsimile number obtainable from the fax job information. The communication line controller 11 further sends the specified image data to the specified destination using the G3 fax modem 10 through the PSTN, and the operation ends.

At S1105, the MFP FX obtains the image data corresponding to the first page, and expands the obtained image data to expanded image data. As described above referring to FIG. 19, the image data of the first page, which corresponds to the cover sheet data, is received from the PC in the form of MMR image data.

At S1106, the MFP FX applies JPEG compression to the expanded image data to generate JPEG image data.

At S1107, the MFP FX reconstructs the image data such that the JPEG image data of the first page, which is generated at S1106, is to be the first page.

At S1108, the MFP FX causes the LAN controller 13 to call the destination specified by the fax job information based on the standardized procedure such as ITU-T Recommendation H.323 or SIP, for example, using the facsimile number or the address obtainable from the fax job information. When the connection with the destination is established, such as through a communication path, the MFP FX sends the image data generated at S1107 to the destination using a predetermined procedure that is specific to the MFP FX, and the operation ends.

As described above referring to FIGS. 19 and 20, when the image data is provided with a cover sheet, the cover sheet is transmitted in the form of monochrome image data even when the color facsimile transmission type is selected for the image data to be transmitted. Further, the cover sheet is transmitted in the compressed image data. This reduces the data size of the overall image data to be transmitted through the network, while still allowing the image data other than the cover sheet to be sent in the form of color image data.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

For example, the steps illustrated in any one of FIGS. 7 to 17B, and 19 to 20 may be performed in the order different from the order described above.

Figure 21:
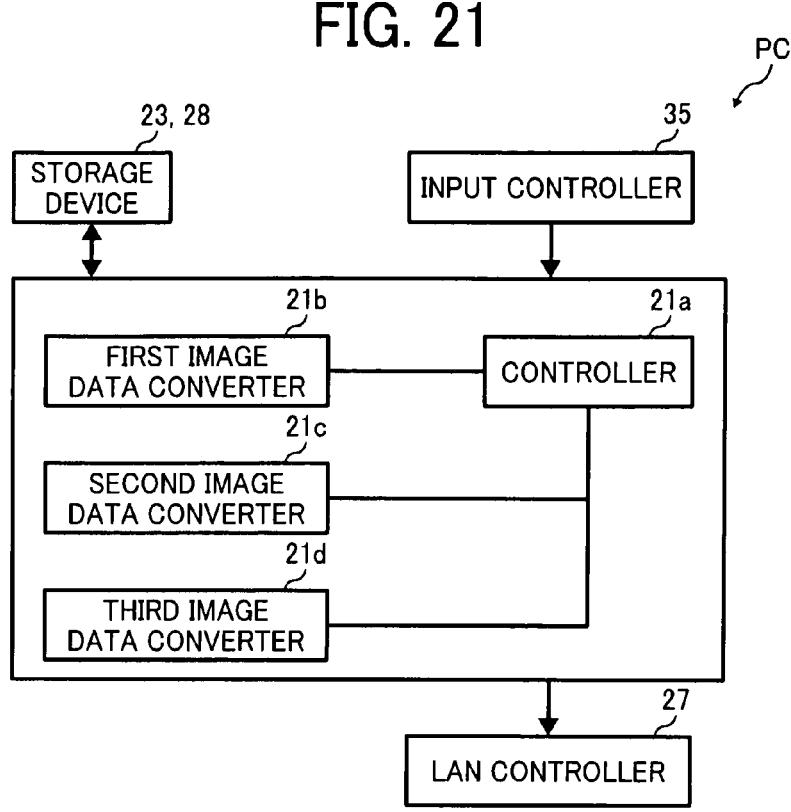
FIG. 21 is a schematic block diagram illustrating a functional structure of a portion of the computer of FIG. 3, according to an example embodiment of the present invention.

Further, when performing any one of the above-described operations illustrated in any one of FIGS. 7, 11, 13, 14A, 14B, 16, and 19, the CPU 21 of the computer 3 of FIG. 3 may be executed to cause the operation control program stored in the ROM 22 to be loaded onto the RAM 23. The operation control program then causes the CPU 21 to perform any one of the above-described operations. For example, when activated by the operation control program, the CPU 21 may cause to have a functional structure illustrated in FIG. 21. Referring to FIG. 21, the CPU 21 includes a controller 21a, a first image data converter 21b, a second image data converter 21c, and a third image data converter 21d. The third image data converter 21d may not be provided. The first image data converter applies monochrome data conversion such as color-monochrome image conversion, MMR compression, etc. The second image data converter applies first color data conversion such as lossy compression including JPEG compression, etc. The third image data converter applies second color data conversion such as color space conversion as necessary to generate RGB image data, or image data in any desired standard format that is widely used by any apparatus. Alternatively, the third image data converter may compress the image data using lossless compression. When the data to be transmitted is already in RGB format, the third image data converter does not have to apply conversion.

In one example operation, when the input controller 35 receives a user instruction input by a user, the controller 21a determines whether data is to be transmitted in monochrome or color according to the user instruction. For example, the use instruction includes destination information specifying a destination to which data is to be transmitted and transmission type information specifying a transmission type for the destination. In this example, the data to be transmitted may be stored in any desired storage device such as the RAM 23 or the disk device 28. The controller 21a determines whether data is to be transmitted in monochrome or color according to the transmission type information obtained from the user instruction to generate a first determination result. When the first determination result indicates that the data is to be transmitted in monochrome, the controller 21a causes the first image data converter 21b to convert the data to monochrome image data. When the first determination result indicates that the data is to be transmitted in color, the controller 21a causes the second image data converter 21c to convert the data to color image data. The LAN controller 27 may send a job request to the MFP FX, which includes the destination information, the transmission type information, and at least one of the monochrome image data and the first color image data that is generated according to the first determination result.

In another example operation, the controller 21a may further determine whether the destination information obtained from the user instruction specifies more than one destination to generate a second determination result before generating the first determination result. When the second determination result indicates that more than one destination is specified, the controller 21a causes the third image data converter 21d to convert the data to second color image data.

Figure 22:
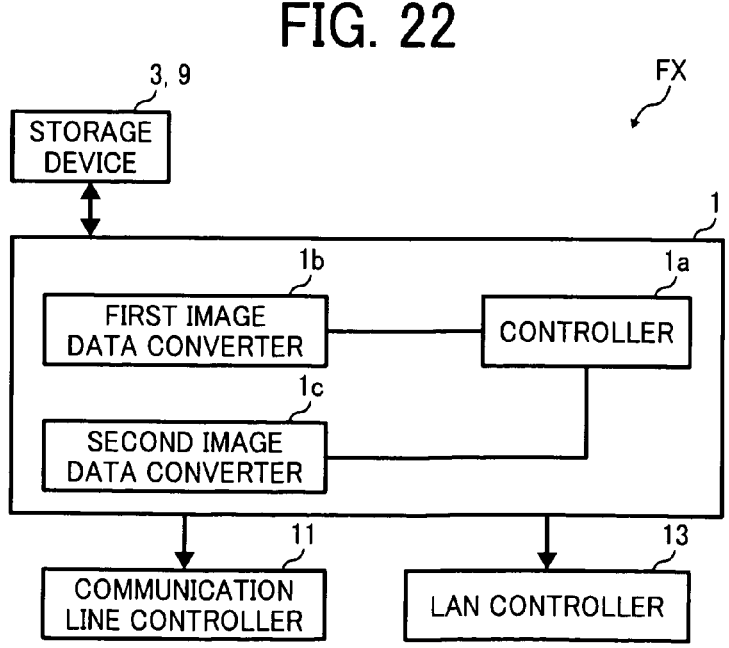
FIG. 22 is a schematic block diagram illustrating a functional structure of a portion of the multifunctional apparatus of FIG. 2, according to an example embodiment of the present invention.

Further, when performing any one of the above-described operations illustrated in FIGS. 10, 12A, 12B, 15A, 15B, 17A, 17B, and 20, the system controller 1 of the MFP FX of FIG. 2 may be executed perform any one of the above-described operations according to the operation control program. For example, when activated by the operation control program, the system controller 1 may cause to have a functional structure illustrated in FIG. 22. The system controller 1 includes a controller 1a, a first image data converter 1b, and a second image data converter 1c. The first image data converter 1b and the second image data converter 1c are respectively similar in function to the first image data converter 21b and the second image data converter 21c of FIG. 21.

In one example operation, when the job request including at least one of monochrome image data and first color image data is received, the controller 1a of the MFP FX may select one of the communication line controller 11 and the LAN controller 13, for example, according to transmission type information obtained from the job request.

In another example operation, when the job request including second color image data is received, the controller 1a of the MFP FX may determine whether the second color image data is to be transmitted in monochrome or color according to the transmission type information obtained from the job request to generate a third determination result. When the third determination result indicates that the second color image data is to be transmitted in monochrome, the controller 1a causes the first image data converter 1b to convert the second color image data to monochrome image data, and further causes the communication line controller 11 to transmit the monochrome image data to a destination. When the third determination result indicates that the second color image data is to be transmitted in color, the controller 1a causes the second image data converter 1c to convert the second color image data to first color image data, and further causes the LAN controller 13 to transmit the second color image data to a destination.

Further, the operation illustrated in any one of FIGS. 7 to 17B, and 19 to 20 may be performed in various other ways. For example, the PC may request the MFP FX to transmit data specified by the user from a source apparatus that stores the specified data to a destination apparatus specified by the user at the PC. The source apparatus may be any apparatus other than the PC including, for example, the MFP FX or a document server that is provided on the communication system CS. In such case, the image data may not included in the job fax information, which is sent from the PC to the MFP FX.

In one example operation, the image data may be stored in a document server by any user. For example, the image data may be uploaded from the PC when the PC is instructed from the user. Any user may request the MFP FX to send the image data from the storage device to a specific destination using any one of the black/white fax communication function, the color fax communication function, the email function, and the server function, each being provided by the MFP FX. When requesting, the user may input, through the PC, various information such as information regarding the destination, information regarding the transmission type, or information regarding the image data to be transmitted. Based on the information input by the user, the PC generates fax job information and stores the fax job information at least temporarily. Once the fax job is created, the PC may cause the document server to apply specific processing to the image data specified by the user. For example, the PC may instruct the document server to generate MMR image data when the transmission type is the black/white facsimile transmission type, and send the MMR image data to the MFP FX. In another example, the PC may instruct the document server to generate JPEG image data when the transmission type is the color facsimile transmission type, and send the JPEG image data to the MFP FX. Further, the PC may send the fax request to the MFP FX to cause the MFP FX to transmit the image data, which is obtained from the document server, to a specific destination. Before sending the image data to the specific destination, image processing may be applied to the image data.

In another example, information regarding the registered address such as the address information table T3 may be stored in any device or apparatus other than a memory provided in the MFP FX.

In another example, after determining whether the destination specified by the destination information obtained from the user instruction includes more than one destination, or a plurality of destinations, the PC may determine whether the transmission type information for the plurality of destinations includes more than one transmission type. Alternatively, the PC may determine whether the transmission type information obtained from the user instruction indicates more than one transmission type. For example, referring back to FIG. 11, at S302, the PC may determine whether the transmission type information for the plurality of destinations includes at least the b/w facsimile transmission type and the color facsimile transmission type each causing the MFP FX to use different functions when sending the image data. In another example, referring back to FIG. 17B, S916, S922, and S926 may be replaced by one step of determining whether the transmission type specified by the user includes at least two different transmission types each causing the MFP FX to use different functions to send the image data.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

For example, the present invention may reside in a method of controlling a communication system. The communication system includes a terminal, and an image data transmission apparatus coupled to each other via a network. The terminal sends a job request including job information to the image data transmission apparatus through the network. The image data transmission apparatus includes a first communication device to transmit the image data in the form of monochrome image using a black/white communication function, and a second communication device to transmit the image data in the form of color image using a color communication function.

When the terminal receives a user instruction, which includes destination information specifying a destination to which image data is to be transmitted and transmission type information specifying a transmission type specifying the black/white communication function, the terminal generates job information including the destination information, the transmission type information specifying the black/white communication function, and monochrome image data that is generated by the terminal. The terminal further sends the job information in the form of job request to the image data transmission apparatus through the network.

When the terminal receives a user instruction, which includes destination information specifying a destination to which image data is to be transmitted and transmission type information specifying a transmission type specifying the color communication function, the terminal generates job information including the destination information, the transmission type information specifying the color communication function, and color image data that is generated by the terminal. The terminal further sends the job information in the form of job request to the image data transmission apparatus via the network.

When the job request is received, the image data transmission apparatus obtains the transmission type information from the job information. When the image data transmission apparatus determines that the transmission type specifies the black/white communication function, the image data transmission apparatus causes the first communication device to send the monochrome image data obtained from the job information to the destination specified by the destination information obtained from the job information. When the image data transmission apparatus determines that the transmission type specifies the color communication function, the image data transmission apparatus causes the second communication device to send the color image data obtained from the job information to the specific destination specified by the destination information obtained from the job information.

In another example, in the above-described method, when the destination includes a plurality of destinations and the transmission type includes a transmission type specifying the black/white communication function and a transmission type specifying the color communication function for the plurality of destinations, the terminal generates a destination information table storing, for each destination, the destination information specifying the destination and the transmission type information that is assigned for the destination. The terminal further sends a job request including the destination information table, the monochrome image data that is generated by the terminal, and the color image data that is generated by the terminal, to the image data transmission apparatus through the network.

When the plurality of destinations are specified by the job request that is received, the image data transmission apparatus obtains the transmission type information regarding the transmission type for each one of the plurality of destinations. When the image data transmission apparatus determines that the transmission type specifies the black/white communication function, the image data transmission apparatus causes the first communication device to send the monochrome image data obtained from the job information to the destination specified by the destination information obtained from the job information. When the image data transmission apparatus determines that the transmission type specifies the color communication function, the image data transmission apparatus causes the second communication device to send the color image data obtained from the job information to the specific destination specified by the destination information obtained from the job information.

In another example, in the above-described method, when the destination includes a plurality of destinations and the transmission type includes a transmission type specifying the black/white communication function and a transmission type specifying the color communication function for the plurality of destinations, the terminal generates a destination information table storing, for each destination, the destination information specifying the destination and the transmission type information that is assigned for the destination. The terminal further sends a job request including the destination information table and the color image data that is generated by the terminal, to the image data transmission apparatus through the network.

When the plurality of destinations are specified by the job request that is received, the image data transmission apparatus obtains the transmission type information regarding the transmission type for each one of the plurality of destinations. When the image data transmission apparatus determines that the transmission type specifies the black/white communication function, the image data transmission apparatus generates monochrome image data from the color image data obtained from the job information, and causes the first communication device to send the monochrome image data to the destination specified by the destination information obtained from the job information. When the image data transmission apparatus determines that the transmission type specifies the color communication function, the image data transmission apparatus causes the second communication device to send the color image data obtained from the job information to the destination specified by the destination information obtained from the job information.

In another example, the present invention may be implemented by the above-described communication system, which performs any one of the above-described operations. Alternatively, the present invention may be implemented by a recording medium storing instructions which cause a computer to perform any one of the above-described operations.

What is claimed is:

1. A requesting apparatus coupled to an image data transmission apparatus through a network, the requesting apparatus comprising:
   an input controller configured to receive a user instruction input by a user, the user instruction including destination information specifying a destination to which data is to be transmitted and transmission type information specifying a transmission type for the destination;
   a storage device configured to store the data to be transmitted;
   a first image data converter configured to apply monochrome data conversion;
   a second image data converter configured to apply first color data conversion;
   a controller configured to determine whether the data is to be transmitted in monochrome or color according to the transmission type information obtained from the user instruction to generate a first determination result, to cause the first image data converter to convert the data to monochrome image data when the first determination result indicates that the data is to be transmitted in monochrome, and to cause the second image data converter to convert the data to first color image data when the first determination result indicates that the data is to be transmitted in color; and
   an output controller configured to send a job request to the image data transmission apparatus through the network, the job request including the destination information, the transmission type information, and at least one of the monochrome image data and the first color image data that is generated according to the first determination result;
   a third image data converter configured to apply second color data conversion, wherein:
   the controller is further configured to determine whether the destination information obtained from the user instruction specifies more than one destination to generate a second determination result before generating the first determination result, and to cause the third image data converter to convert the data to second color image data when the second determination result indicates that more than one destination is specified, and:
   the output controller is configured to send a job request to the image data transmission apparatus through the network, the job request including the destination information, the transmission type information, and the second color image data.

2. A requesting apparatus coupled to an image data transmission apparatus through a network, the requesting apparatus comprising:
   an input controller configured to receive a user instruction input by a user, the user instruction including destination information specifying a destination to which data is to be transmitted and transmission type information specifying a transmission type for the destination;
   a storage device configured to store the data to be transmitted;
   a first image data converter configured to apply monochrome data conversion;
   a second image data converter configured to apply first color data conversion;
   a controller configured to determine whether the data is to be transmitted in monochrome or color according to the transmission type information obtained from the user instruction to generate a first determination result, to cause the first image data converter to convert the data to monochrome image data when the first determination result indicates that the data is to be transmitted in monochrome, and to cause the second image data converter to convert the data to first color image data when the first determination result indicates that the data is to be transmitted in color; and
   an output controller configured to send a job request to the image data transmission apparatus through the network, the job request including the destination information, the transmission type information, and at least one of the monochrome image data and the first color image data that is generated according to the first determination result, wherein
   when the user instruction further includes cover sheet information specifying that cover sheet data is to be added to the data to be transmitted, the controller is further configured to cause the first image data converter to convert a portion of the data to be transmitted that corresponds to the cover sheet data to monochrome image data even when the first determination result indicates that the data is to be transmitted in color.

3. A requesting apparatus coupled to an image data transmission apparatus through a network, the requesting apparatus comprising:
   an input controller configured to receive a user instruction input by a user, the user instruction including destination information specifying a destination to which data is to be transmitted and transmission type information specifying a transmission type for the destination;

a storage device configured to store the data to be transmitted;

a first image data converter configured to apply monochrome data conversion;

a second image data converter configured to apply first color data conversion;

a controller configured to determine whether the data is to be transmitted in monochrome or color according to the transmission type information obtained from the user instruction to generate a first determination result, to cause the first image data converter to convert the data to monochrome image data when the first determination result indicates that the data is to be transmitted in monochrome, and to cause the second image data converter to convert the data to first color image data when the first determination result indicates that the data is to be transmitted in color; and an output controller configured to send a job request to the image data transmission apparatus through the network, the job request including the destination information, the transmission type information, and at least one of the monochrome image data and the first color image data that is generated according to the first determination result, wherein the transmission type obtained from the user instruction includes at least one of:

a black/white facsimile transmission type to cause the image data transmission apparatus to send the monochrome image data using a black/white facsimile communication function of the image data transmission apparatus;

a color facsimile transmission type to cause the image data transmission apparatus to send the color image data using a color facsimile communication function of the image data transmission apparatus;

an email transmission type to cause the image data transmission apparatus to send the color image data using an email function of the image data transmission apparatus; and an file transfer protocol transmission type to cause the image data transmission apparatus to send the color image data using a server function of the image data transmission apparatus.

4. A communication system, comprising:

a requesting apparatus; and an image data transmission apparatus coupled to the requesting apparatus through a network, wherein the requesting apparatus includes:

an input controller configured to receive a user instruction input by a user, the user instruction including destination information specifying a destination to which data is to be transmitted and transmission type information specifying a transmission type for the destination;

a storage device configured to store the data to be transmitted;

a first image data converter configured to apply monochrome data conversion;

a second image data converter configured to apply first color data conversion;

a first controller configured to determine whether the data is to be transmitted in monochrome or color according to the transmission type information obtained from the user instruction to generate a first determination result, to cause the first image data converter to convert the data to monochrome image data when the first determination result indicates that the data is to be transmitted in monochrome, and to cause the second image data converter to convert the data to first color image data when the first determination result indicates that the data is to be transmitted in color; and an output controller configured to send a job request to the image data transmission apparatus through the network, the job request including the destination information, the transmission type information, and at least one of the monochrome image data and the first color image data that is generated according to the first determination result, and: the image data transmission apparatus includes:

a first communication device configured to communicate through a network using a first communication protocol;

a second communication device configured to communicate through the network using a second communication protocol; and a second controller configured to cause the first communication device to transmit the monochrome image data to a destination apparatus specified by the destination information when the job request includes the monochrome image data, and to cause the second communication device to transmit the first color image data to a destination apparatus specified by the destination information when the job request includes the first color image data.

5. The communication system of claim 4, wherein: the requesting apparatus further comprises:

a third image data converter configured to apply third data conversion, wherein:

the first controller is further configured to determine whether the destination information obtained from the user instruction specifies more than one destination to generate a second determination result before generating the first determination result, and to cause the third image data converter to convert the data to second color image data when the second determination result indicates that more than one destination is specified, and:

the output controller is configured to send a job request to the image data transmission apparatus through the network, the job request including the destination information, the transmission type information, and the second color image data, wherein: the image data transmission apparatus further comprises:

a first image data converter configured to apply monochrome data conversion; and a second image data converter configured to apply first color data conversion, wherein the second controller is further configured to determine whether the second color image data is to be transmitted in monochrome or color according to the transmission type information obtained from the job request to generate a third determination result, and to cause the first image data converter to convert the second color image data to monochrome image data when the third determination result indicates that the second color image data is to be transmitted in monochrome, and to cause the second image data converter to convert the second color image data to first color image data when the third determination result indicates that the second color image data is to be transmitted in color.

6. A method of controlling a communication system including a requesting apparatus and an image data transmission apparatus coupled through a network, the method comprising:

receiving a user instruction input by a user, the user instruction including destination information specifying a destination to which data is to be transmitted and transmission type information specifying a transmission type for the destination;

storing the data to be transmitted in a storage device; providing a first image data converter configured to apply monochrome data conversion;

providing a second image data converter configured to apply first color data conversion;

determining whether the data is to be transmitted in monochrome or color according to the transmission type information obtained from the user instruction to generate a first determination result;

converting the data to monochrome image data using the first image data converter when the first determination result indicates that the data is to be transmitted in monochrome;

converting the data to first color image data when the first determination result indicates that the data is to be transmitted in color; and sending a job request to the image data transmission apparatus through the network, the job request including the destination information, the transmission type information, and at least one of the monochrome image data and the first color image data that is generated according to the first determination result;

providing a third image data converter configured to apply second color data conversion;

determining whether the destination information obtained from the user instruction specifies more than one destination to generate a second determination result before generating the first determination result; and converting the data to second color image data using the third image data converter when the second determination result indicates that more than one destination is specified, wherein the sending a job request to the image data transmission apparatus through the network comprises:

sending a job request to the image data transmission apparatus through the network, the job request including the destination information, the transmission type information, and the second color image data.

* * * * *